(12) United States Patent
Fano et al.

(10) Patent No.: US 7,792,273 B2
(45) Date of Patent: Sep. 7, 2010

(54) REMOTE MEDIA CALL CENTER

(75) Inventors: Andrew E. Fano, Lincolnshire, IL (US); Christopher K. Chung, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 1988 days.

(21) Appl. No.: 10/663,592

(22) Filed: Sep. 15, 2003

(65) Prior Publication Data

US 2009/0067586 A1     Mar. 12, 2009

(51) Int. Cl.
*H04M 3/00* (2006.01)

(52) U.S. Cl. .............................. 379/265.02; 379/265.01

(58) Field of Classification Search ................................. 379/265.01–265.14, 266.01–266.1, 309, 379/45–49; 455/411–413
See application file for complete search history.

(56) References Cited

U.S. PATENT DOCUMENTS

| | | | |
|---|---|---|---|
| 5,761,278 A | 6/1998 | Pickett et al. | |
| 5,799,061 A | 8/1998 | Melcher et al. | |
| 6,271,752 B1 * | 8/2001 | Vaios | 340/541 |
| 6,381,324 B1 | 4/2002 | Shaffer et al. | |
| 6,456,234 B1 * | 9/2002 | Johnson | 342/357.09 |
| 6,466,258 B1 * | 10/2002 | Mogenis et al. | 348/143 |
| 6,563,910 B2 * | 5/2003 | Menard et al. | 379/45 |
| 6,882,307 B1 * | 4/2005 | Gifford | 342/357.1 |
| 6,885,874 B2 * | 4/2005 | Grube et al. | 455/520 |
| 7,158,026 B2 * | 1/2007 | Feldkamp et al. | 340/531 |
| 7,406,507 B2 * | 7/2008 | Piccioni | 709/207 |
| 2002/0057764 A1 | 5/2002 | Salvucci et al. | |
| 2002/0076003 A1 | 6/2002 | Zellner et al. | |
| 2004/0103158 A1 * | 5/2004 | Vella et al. | 709/206 |
| 2004/0104808 A1 * | 6/2004 | Khoshbin | 340/7.5 |
| 2004/0180683 A1 * | 9/2004 | Dennis et al. | 455/521 |
| 2004/0247086 A1 * | 12/2004 | Menard et al. | 379/45 |
| 2004/0266389 A1 * | 12/2004 | Kennedy | 455/404.1 |

FOREIGN PATENT DOCUMENTS

| | | |
|---|---|---|
| EP | 1 087 598 A2 | 3/2001 |
| EP | 1 087 598 A3 | 12/2003 |

OTHER PUBLICATIONS

European Examination Report, dated Nov. 10, 2009, pp. 1-5, European Patent Application No. 04 765 353.0-2414, European Patent Office, Germany.

Indian Examination Report, dated Jan. 16, 2008, p. 1, Indian Patent Application No. 414/MUMNP/2006, Indian Intellectual Property Office, India.

* cited by examiner

*Primary Examiner*—William J Deane
(74) *Attorney, Agent, or Firm*—Brinks Hofer Gilson & Lione

(57) ABSTRACT

The call center processing system disclosed enhances the capabilities of traditional call centers. In particular, the processing system allows a call center to receive, aggregate, and index many different types of media obtained from a wide variety of sources and that relate to many different types of incidents. Thus, for example, the processing system provides a third party with the option of submitting call phone camera pictures, audio input, video camera footage, and other types of media when reporting an incident to the call center. The call center may be an emergency number (e.g., 911) call center, a service center (e.g., for a home appliance), a news reporting call center, or any other type of interactive information exchange.

102 Claims, 15 Drawing Sheets

Incident Report 114

| Incident Type 202 | Incident Location 204 | Incident Time 206 | Incident Description 208 | Incident Parties 210 |

Classification Information 115

| Name 212 | Contact Information 214 | Media Information 216 | Submitter Characteristics 218 |

Media Record 118

| Incident Report 114 | Classification Information 115 | Media Type 220 | Media Description 222 | Media Length 224 | MediaPointer 226 |

Entity Record 406: Entity ID 502 | Alert Parameters 504

Location Record 410: Entity ID 506 | Location 508

Incident Alert 600: Entity ID 602 | Alert Description 604 | Alert Media 606

Sensor activation Instruction 1000: Sensor ID 1002 | Capture Parameters 1004

REMOTE MEDIA CALL CENTER

CROSS REFERENCE TO RELATED APPLICATIONS

Background

1. Technical Field

The present invention relates to electronic media acquisition, indexing, storage, association, and communication. In particular, the present invention relates to enhancing existing services including call centers, news services, and police and other emergency services with electronic media obtained from a variety of sources in a uniform or ad-hoc manner.

2. Background Information

The technologies supporting and incorporated into consumer electronics devices, driven by strong market demand, have matured rapidly and become quite powerful in a short time period. In cellular telephony, for instance, portable phones have quickly evolved from cumbersome heavy devices to miniature lightweight all purpose communicators. The level of technology integration and sophistication in portable phones has risen to the point where cell phones now incorporate digital cameras, voice annotation, email, calendaring, and appointment functions in a single package.

Similarly, miniaturization, sensitivity, and resolution advances have benefited security cameras, microphones, motion sensors, proximity sensors and other types of sensing equipment. As an example, inexpensive security cameras, less than an inch and a half in diameter, are available that provide color video and wireless image transmission to a remote surveillance location. Similarly, small high sensitivity microphones are available to supplement security images with real time audio feedback, and 3-mega pixel digital cameras are commonplace.

In other settings, however, technology has not had such a dramatic impact. For example, an emergency call center (e.g., a 911 call center) typically has limited technological resources that it can draw upon to handle emergency calls. Some call centers may only include a telephone interface to handle incoming calls, a radio dispatch interface to alert the relevant authorities, and a call routing system to direct incoming calls to the appropriate operators. As another example, an appliance maintenance hotline may simply include a telephone interface to handle incoming calls, a technician that responds to the telephone calls, and a pre-generated service manual stored on a local machine that the technician may consult while handling the call.

As a result, individuals often experience a frustrating disconnect between the capabilities associated with the devices they use on a daily basis, and services that they turn to for help or for information. In many instances individuals have the capability to capture media that would greatly improve the service they could receive from a call center, but call centers are unprepared to accept and incorporate the media into their processes. The technology gap renders call centers and other services exasperating and sometimes annoying to use. More importantly, however, the call centers and other services are less effective than they otherwise could be, and therefore, as an example, less adept at rendering aid, disseminating information, and protecting citizens through law enforcement related activities.

There is a need for addressing the problems noted above and other previously experienced.

BRIEF SUMMARY

Methods and systems consistent with the present invention provide a call center processing system. The call center processing system provides features (based on the particular implementation of the call center) that enhance the capabilities of traditional call centers. In one implementation, the call center includes a network infrastructure interface for receiving an incident report from an external network, a media database, and a processing system. The processing system may include a memory including a media aggregation program, and a processor that executes the media aggregation program.

The media aggregation program is not limited to any particular implementation or feature set. In one implementation, for example, the media aggregation program may include instructions for accepting media associated with the incident report, obtaining classification information from the external network, and obtaining incident information from the incident report. The aggregation program may also include instructions for building a media record from the incident information and the classification information, and storing the media record and the media in the media database. The media may include cell phone camera pictures, security camera video, microphone audio output, and other types of information obtained from a wide variety of sensors.

In many instances, the third party that submits the incident report also submits the first piece or pieces of related media (e.g., a cell phone camera image). However, the media aggregation program may also aggregate related media obtained from other sources. For example, the media aggregation program may also include instructions for accepting supplemental sensor media from other sensors than those by the initial submitter of the incident report and for aggregating the supplemental sensor media in the media database, optionally indexed or associated with selected incident or classification information.

Methods and systems consistent with the present invention also provide a call center investigation tool. The investigation tool may be implemented, for example, using a media database in cooperation with an investigation program. Generally, the investigation program responds to a user interface and provides search and report generation capability. For example, in one implementation, the investigation program may include instructions for accepting incident search parameters, initiating execution of an incident search in the media database based on the search parameters, and displaying a selection interface comprising media record indicia associated with matching media records returned from the incident search. The investigation program may further include instructions for displaying an investigation report interface, and accepting report components for building an investigation report in the report interface. The investigation report may include selected media records and other information relating to the incident.

In other implementations, the investigation tool includes additional or different capabilities. As one example, the investigation tool may also display an area map of the location where an incident occurred, along with incident indicia that graphically indicates the incident location. In other implementations, the investigation tool may also respond to a locator icon, as one example, a security camera icon. In response to activation of the security camera icon, the investigation program may then display sensor indicia on the area map that graphically indicate locations from which supplemental media have been obtained.

DETAILED DESCRIPTION

Figure 1:
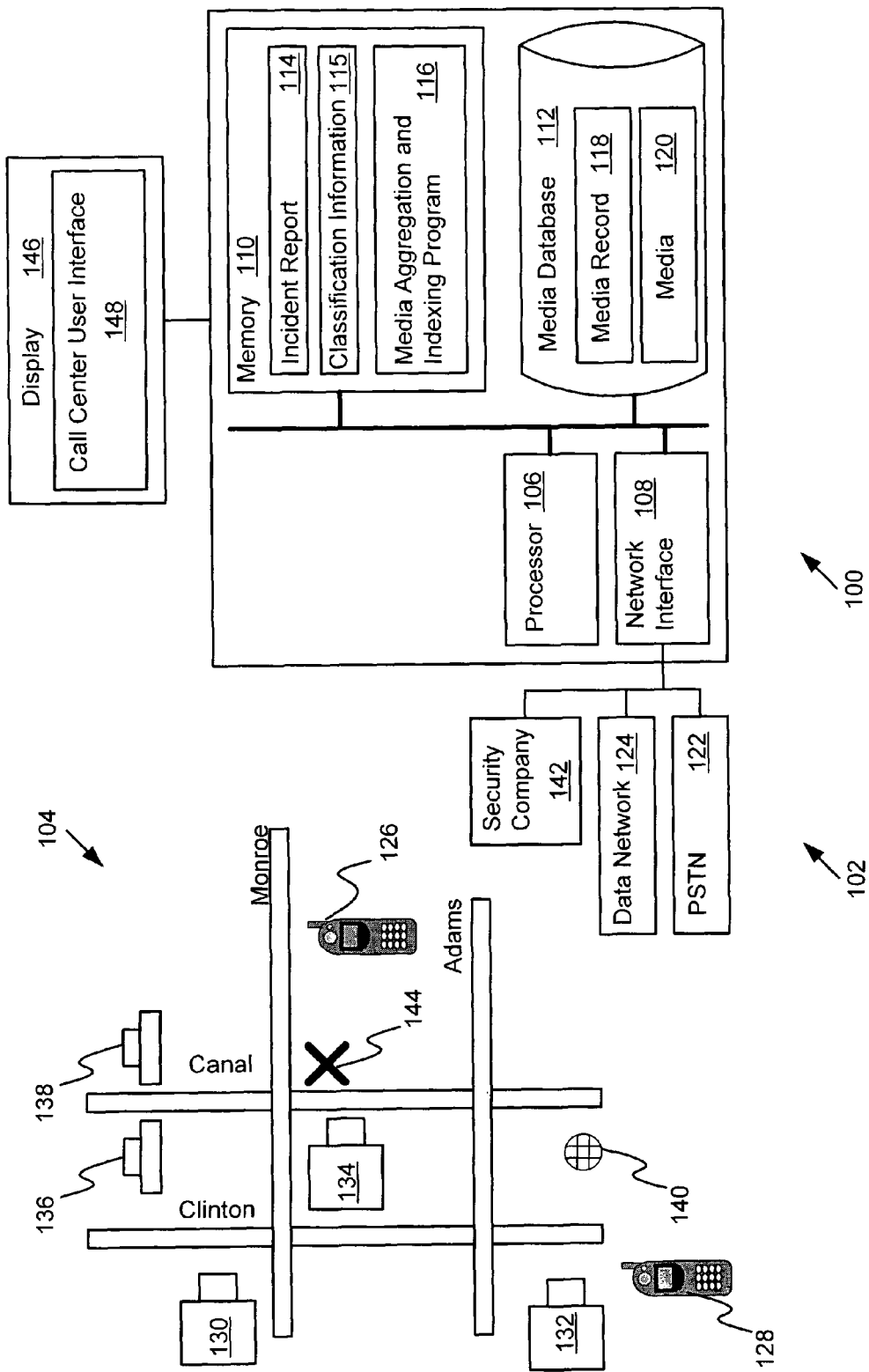
FIG. 1 illustrates a call center processing system, in communication with external networks and media sensors, that aggregates and indexes media obtained from external sensors.

FIG. 1 shows a call center processing system 100 ("call center 100") in communication with external networks 102 and media sensors in place in a geographical area 104. The call center 100 includes a processor 106 coupled to a network infrastructure interface 108, a memory 110, and a media database 112. The processor 106 executes programs out of the memory 110. The memory 110 holds, during processing, incident reports 114 and classification information 115. The memory 110 also holds in whole or in part processing programs including a media aggregation program 116. The media database 112 includes media records 118 that index the media 120. A display 146 provides a visual interface to the processing system 100, and, for example, presents a call center user interface 148 to the operator of the call center 100.

Included in the external networks 102 are a Public Switched Telephone Network (PSTN) 122 and a dedicated data network 124. The PSTN 122 primarily handles telephone communications between landline and mobile subscribers. To that end, the PSTN 122 may communicate with wireless base stations that bi-directionally communicate with mobile subscribers. While a significant amount of the traffic on the PSTN 122 is voice data for telephone conversations, the PSTN 122 may also support bi-directional communication of data encoded and decoded, for example, by modems or other data network interfaces to the PSTN 122.

The dedicated data network 124 primarily handles general purpose data transfers between a source and a destination. While the dedicated data network 124 may carry digitized voice samples supporting telephone conversations, its role is more general purpose in nature. Thus, the dedicated data network 124 may represent a local or wide area computer network, including the Internet, over which data of any sort may propagate.

As will be explained in more detail below, the external networks 102, regardless of implementation, support the communication of media to and from media sensors external to the call center 100. The media may take many forms, including audio and visual data that conveys information about a location in a geographical area. Generally, the media conveys information about a geographical area or incidents that have occurred, are occurring, or that may occur in the geographical area. To that end, the media may include individual images, an image slideshow of individual images captured at pre-selected intervals, a video stream (e.g., security camera footage), an audio stream, motion sensor detections, proximity sensor detections, and other informative data that conveys information about a geographical area. The media may be live, or stored and retrieved upon demand, for example, from the security company 142.

The external networks 102 communicate with media sensors in the geographical area 104. FIG. 1 shows a particular example of a geographical area 104 that extends over several blocks from Adams Street to Monroe Street and from Clinton Street to Canal Street. The media sensors include: the mobile cell phones 126 and 128; the security cameras 130, 132, and 134; the motion sensor 136; the proximity sensor 138; and the microphone 140.

A security company premise 142 is also present and may represent one or more security companies that install, monitor, and maintain the security cameras 130-134 or any other media sensor or the media captured by the sensors. Thus, the security company 142 may, for example, store recordings obtained from the media sensors for a pre-selected time before deleting the recordings from storage.

Note also that FIG. 1 shows an incident location 144 near the intersection of Canal Street and Monroe Street. The incident location specifies an approximate or exact spatial location at which an event of interest has occurred (e.g., a robbery, a broken water main, or any other incident).

The elements illustrated in FIG. 1 interoperate as explained in more detail below. Before setting forth any additional explanation, however, it is noted that all of the discussion below, regardless of the particular implementation being described, is exemplary in nature, rather than limiting. For example, although selected aspects, features, or components of the implementations are depicted as being stored in the memory 110 and media database 112, all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

Furthermore, although specific components of call center processing systems and investigation tools will be described, methods, systems, and articles of manufacture consistent with the processing systems and investigation tools may contain additional or different components. For example, the processor 106 may be a microprocessor, microcontroller, application specific integrated circuit (ASIC), discrete logic, or a combination of other types of circuits acting as explained above. Similarly, the memory 110 may be DRAM, SRAM, Flash or any other type of memory. With regard to databases, they may be separately stored and managed, incorporated into a single database, or generally logically and physically organized in many different ways. Furthermore, the databases may more generally represent data files that may be searched using techniques other than relational database queries, for example. The individual programs discussed below may be parts of a single program, separate programs, or distributed across several memories and processors.

In addition, the media sensors 126-140 may vary widely in design and implementation. For that reason, the media sensors 126-140 are not limited to the examples given above. Instead the media sensors more generally encompass devices that gather information about the geographical area 104 or incidents occurring in the geographical area 104. Thus, for example, a media sensor may take the form not only of a visible wavelength video camera, but also an infrared video camera. Other media sensors may also be employed, including vibration detectors, laser interferometers, and so forth.

Media Aggregation and Indexing

Returning to FIG. 1, the geographical area 104 encompasses several city blocks. The geographical area 104 may be of arbitrary shape and size, however. As examples, the geographical area 104 may extend over urban or rural areas that include many apartment buildings, homes, high rise office buildings, streets, businesses, and other establishments. Similarly, the geographical area 104 may instead focus more tightly on individual buildings, homes, streets, sporting arenas, or other establishments.

Regardless of the size and shape of the geographical area 104, incidents of interest may occur anywhere within the geographical area 104. For example, FIG. 1 shows an incident location 144 near the corner of Canal and Monroe Streets. Generally, the incident location 144 spatially specifies where an incident of interest has occurred. Thus, as examples, the incident location 144 may represent the intersection at which a pedestrian was hit by a cab, where a mugging took place, where an electrical wire has broken, or where any other incident of interest has occurred.

Typically, a third party (e.g., a person without any particular connection to the call center 100) may witness or experience the incident. In response, the third party may contact the call center to report the incident or to request assistance at the incident location 144. For example, when the incident is a mugging, the third party may witness the mugging and contact the call center 100 to obtain police assistance. To that end, the third party communicates with the call center 100 through the external networks 102. As one example, the third party may carry the cell phone 126, and place a wireless call to the call center 100 through the PSTN 122.

At the call center 100, the network infrastructure interface 108 communicates with the external networks 102 to receive an incident report 114 from the third party. Additionally, the media aggregation program 116 accepts media from the third party relating to the incident. As one example, the cell phone 126 may include a digital camera and a microphone that has captured visual or aural media showing the incident itself, showing the incident location 144 before, during, or after the incident, or showing a nearby location before, during, or after the incident. The third party may then instruct the cell phone 126 to transmit the media to the call center 100 in conjunction with the incident report. Additionally, the third party may provide classification information to the call center 100. The classification information and the incident report are discussed in more detail below.

When the call center receives the media, the classification information, and the incident report, the media aggregation program 116 obtains incident information, that generally may be selected from the incident report. The aggregation program 116 employs the incident information and classification information in building a media record for the incident. The aggregation program 116 stores the media record and the media received in the media database 112. As a result, the call center 100 begins to compile not only initial information concerning reported incidents, but also many different types of media over time that may help illustrate, explain, and understand the incident or the geographical area 104.

As will be explained in more detail below, the call center 100 may subsequently accept supplemental sensor media and aggregate the supplemental sensor media with the data already present in the media database 112. The supplemental sensor media may arrive at the call center 100 from any external media sensor, including the media sensors 126-140. As examples, the security camera 134 may provide video footage to the call center 100, or the motion sensor 136 may provide a detection signal to the call center 100 that indicates at what times the motion sensor 136 detected motion in its coverage area.

The call center 100 stores the supplemental media in the media database 112. For each sensor from which supplemental media arrives, the call center 100 may also receive or obtain supplemental incident information and characteristic information associated with the sensor. Thus, the call center 100, when storing the supplemental media in the media database, may also prepare a supplemental media record prepared in accordance with the supplemental incident information. As a result, the media 120 in the media database is indexed and searchable and enhances the call center 100 with a multimedia searchable support database for incident reporting and investigation. In other words, the call center 100 is not limited to short voice recordings (e.g., for a 911 call center), but has expanded capability to handle any type of media that may help interpret, explain, or investigate individual incidents.

Although the incident example presented above was a mugging reported to an emergency call center 100, the call center 100 is not limited to any particular need or use. In other implementations, the call center may represent a service center, a news agency, or another information service. In the context of a service center, for example, the third party may place an incident report to obtain technical support for a malfunctioning refrigerator. The third party may then provide media with the incident report to show pictures, video, or audio media that relate to the incident. For example, the media may show a picture of a malfunctioning automatic ice maker. In cases in which the appliance is network ready and accessible, the appliance may itself provide supplemental media (e.g., temperature, motor speed, or power consumption sensor readings) to the call center to assist with the troubleshooting process. As another example, a home owner may transmit media (e.g., a digital picture of a home cable box) to a cable television installation service in order to assist an installation technician with determining what cabling, hardware, or other installation requirements need to be met at the home in order to deliver the cable television service.

As noted above, the call center 100 aggregates the media it receives in the media database 112. The media is indexed, for example, using media records 118, to provide a searchable research and investigation database for related media. A media record 118 may be implemented in many different ways, and may, for example, incorporate information obtained from the incident report 114 or classification information.

Figure 2:
FIG. 2 shows an example of a media record, classification information, and an incident report that the call center processing system of FIG. 1 may process, analyze, and store.

With regard to FIG. 2, that figure shows one example implementation for an incident report 114, classification information 115, and the media record 118. As an introduction, the incident report 114, classification information 115 and media record 118 are generally implemented as multi-bit data fields that may include multi-bit subfields to represent the information explained below. The incident report 114 includes incident information that characterizes or describes the incident of interest or the geographical region 104. For example, as shown in FIG. 2, the incident report 114 includes an incident type field 202, an incident location field 204, and an incident time field 206. The incident report 114 also includes an incident description field 208, and incident parties field 210.

The classification information 115 includes a name field 212, a contact information field 214, a media information field 216, and a submitter characteristics field 218. The classification information 115 thereby characterizes the media sensor and optionally the third party providing media to the call center 100.

The media record 118 serves as an index into the media 120 stored in the media database 112. As shown, the media record 118 includes the incident report 114 and the classification information 115. The media record 118 may also include a media type field 220, a media description field 222, a media length field 224, and a media pointer field 226.

More specifically, with regard to the incident report 114, the incident type field 202 specifies the nature of the incident. The incident type 202 may, as examples, encode that the incident is a mugging, robbery, murder, general interest event, mechanical service call for a refrigerator, automobile, or trash compactor, or any other incident for which a third party might contact the call center 100.

The incident location field 204 specifies a spatial position for the incident location 144. To that end, the incident location field 204 may include, as examples, GPS coordinates, a street address or intersection, city, state, zip code, country, or a more general description of the incident location 144 (e.g., "near Union Station in Chicago").

The incident time field 206 specifies the incident temporally. Thus, the incident time field 206 may include a date stamp, a time stamp, or the like.

The incident description field 208 provides a field in which an informative narrative of the incident may be stored. The narrative describe, as examples, the geographical location 144, weather conditions at the time, the nature or extent of the incident (e.g., the number of individuals mugged), and names and addresses of witnesses. The narrative may also include, as additional examples, the lighting conditions at the incident location 104, the nature, amount, or characteristic of property stolen, damaged, or malfunctioning, or any other indicia the describe the incident or its surroundings.

The incident parties field 210 identifies the individuals affected or acting in relation to the incident. As examples, the incident parties field 210 may set forth a name, address, and telephone number of a mugging victim or an appliance owner. The incident parties field 210 may also specify a description, identity, and contact information (when known or available) for a suspect in the incident. For example, the incident parties 210 may give a description of a mugger.

With regard next to the classification information 115, the name field 212 specifies an identifier for the source of the media that the call center 100 received. For example, the named may provide the name of the third party carrying the cell phone 126. Alternatively, for automated sensors that deliver media to the call center 100, the name 212 may specify a convenient reference label for the sensor (e.g., "Canal Street Camera 27"), a serial number, or other naming indicia.

The contact information field 214 provides access information for the person or sensor providing media to the call center 100. For example, the contact information field 214 may specify a home address, phone number, email address, or fax number. Similarly, the contact information field 214 may specify a physical location or an Internet Protocol, Ethernet, or other network address.

The media information field 216 provides a descriptor of the type of media provided to the call center 100. The media information field 216 may, as examples, denote image frames, video, audio, motion sensor response data, or the like. The media information field 216 may also set forth technical specifications of the sensor the captured the media. As examples, the technical specifications may encompass information including image resolution, frames-per-second, sample rate, color depth, encoding format, and the like.

The submitter characteristics field 218 provide a description of the individual and the sensors that send media to the call center 100. For the individual, the description may encompass variables such as age, sex, height, race, nationality, or medical conditions (if known) relating, as examples, to audio or visual impairment. For the sensor, the description may include sensor age, installation date, last service date, and other related information.

With respect to the media record 118, the media record 118 may incorporate all or part of the incident report 114 and all or part of the classification information 115. The media record 118 may also provide additional data fields, including, as examples, the media type field 220, media description field 222, media length field 224, and a media pointer field 226.

The media type field 220 indicates what form the submitted media takes. As examples, the media type may specify a digital camera image, an image slideshow, video footage, audio recording, vibration sensor reading, or another type of sensor output.

The media description field 222 provides a field supporting an informative account of the media. The media description field 222 may, for example, constitute a text based description of the content of the media, its quality, its temporal or physical proximity to one or more geographical areas, or other indicia or descriptors that help characterize the information provided in the media.

The media length field 224 sets forth a temporal duration for the media. Thus, the media length field 224 may give a duration in hours, minutes, and seconds for the media, as an example. Alternatively, the media length may specify a number of images, video frames, audio samples, or other related measures.

The media pointer field 226 provides a reference into the media database 112. The reference locates the media associated with the media record in the media database 112. As a result, the call center may employ the media pointer field 226 to quickly find and retrieve the associated media.

Additional or fewer fields may be present in the incident report 114, classification information 115, and media record 118. Thus, the incident report 114, classification information 115, and media record 118 may be tailored to the particular implementation desired.

Either the incident report 114 or the classification information 115 or both may be transmitted electronically to the call center 100. Alternatively, an operator at the call center 100 may manually complete some or all of the incident report 114 or the classification information 115 based on information received, for example, from a live caller reporting an incident.

Figure 3:
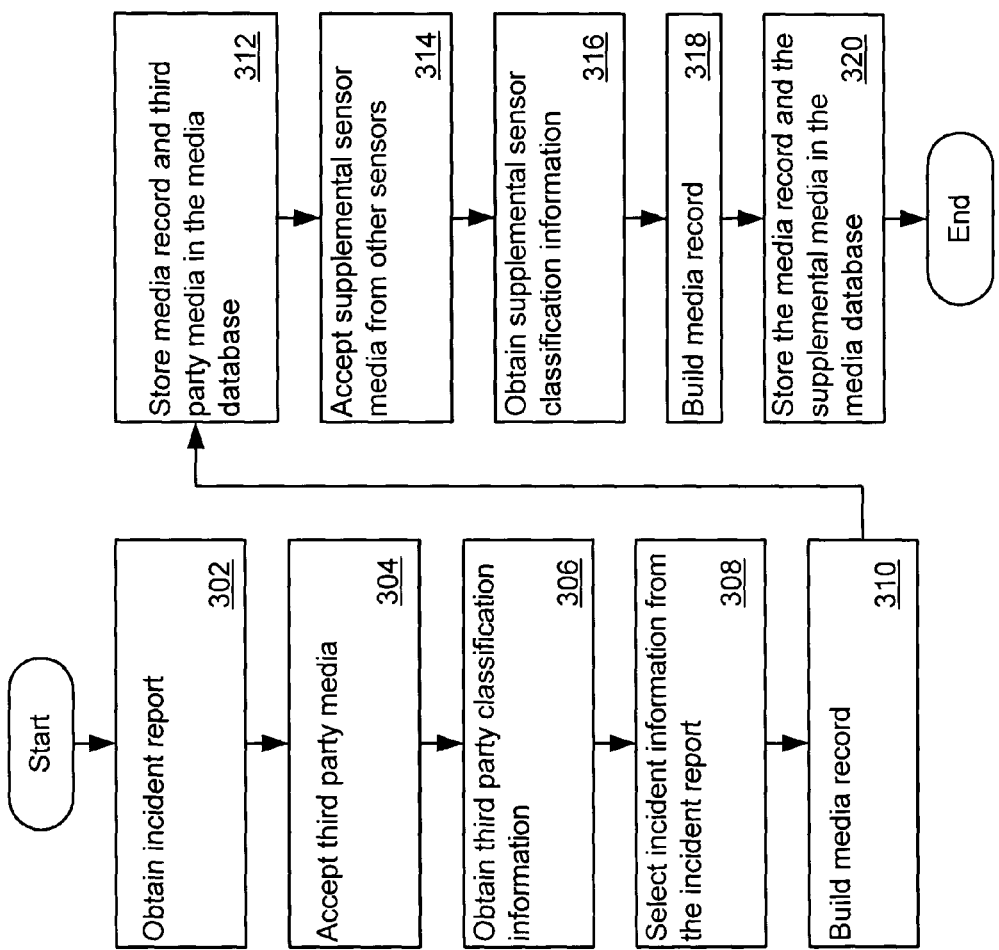
FIG. 3 depicts a flow diagram of steps taken by a media aggregation program executed by the call center processing system shown in FIG. 1.

As noted above, the aggregation program 116 in the call center 100 receives media and responsively builds the media database 112. Turning next to FIG. 3, that figure summarizes a flow diagram of one iteration of the steps taken by the aggregation program 116.

The aggregation program 116 obtains an incident report (Step 302). The incident report sets forth underlying information about the incident and provides one source of information for compiling and indexing the media 120 in the media database 112. In addition to the incident report itself, the aggregation program 116 accepts the media submitted with the incident report (Step 304), for example, by a third party. Furthermore, the aggregation program obtains classification information for the third party (Step 306).

The incident information for the incident report, the classification information, or both may originate from the third party, may be obtained using an automated menu selection tree, or may be obtained from an independent source connected to the external networks 102. For example, the call center 100 may prompt a caller to make touchtone menu selections through a tree of options, to provide a convenient mechanism for obtaining the information noted above. Thus, as one example, the menu tree may include a first level of choices for incident type 202, a second level of choices for incident time 206, a third level of choices for contact information 214, and a fourth level of choices for media information 216. In addition, the third party operating the sensor (e.g., the cell phone, Personal Data Assistant (PDA), digital camera, and so forth) may originate all or some of the classification or incident information. For example, an interactive application on a cell phone or PDA may prompt the third party for classification or incident information, and transmit that information along with the media itself to the call center 100.

In preparation for adding the received media to the media database 112, the aggregation program 116 selects, depending on the particular implementation, some or all of the incident information from the incident report 114 (Step 308). For example, the aggregation program 116 may select the incident type 202, incident location 204, and incident description 208 as information to be included in a media record. The aggregation program 116 then prepares the media record (Step 310). The media record and the media itself are stored in the media database 112 (Step 312).

Additionally, in a manner described in more detail below, the aggregation program 116 may accept supplemental media from other sensors (Step 314). In a manner similar to that noted above with regard to third party media, the aggregation program 116 obtains supplemental classification information for the supplemental sensors (Step 316). The aggregation program 116 responsively builds a media record (Step 318) and stores the media record with the supplemental media in the media database 112 (Step 320).

Media Alerts

In another implementation, the call center 100 employs the media and incident information received to provide a localized alerting service to subscriber entities. The subscriber entities may be individuals, businesses, an electronic display or notifier, or other services that subscribe to the alerting service, with or without paying a fee. Generally, the subscriber entities may be any individual, device, or service for which the call center evaluates whether to send an incident alert. Whether an incident alert is sent may depend on may factors, including information provided by the subscriber entity that specifies what incidents are of interest, the severity level of the incident (e.g., a mugging, rape, or murder may always warrant an incident alert), the location or proximity of the incident (e.g., close to home, school, or work), the relationship (e.g., a son, mother, or friend) of the subscriber entity to parties involved in the incident (e.g., as noted in the incident parties field 210), or any other criteria.

Figure 4:
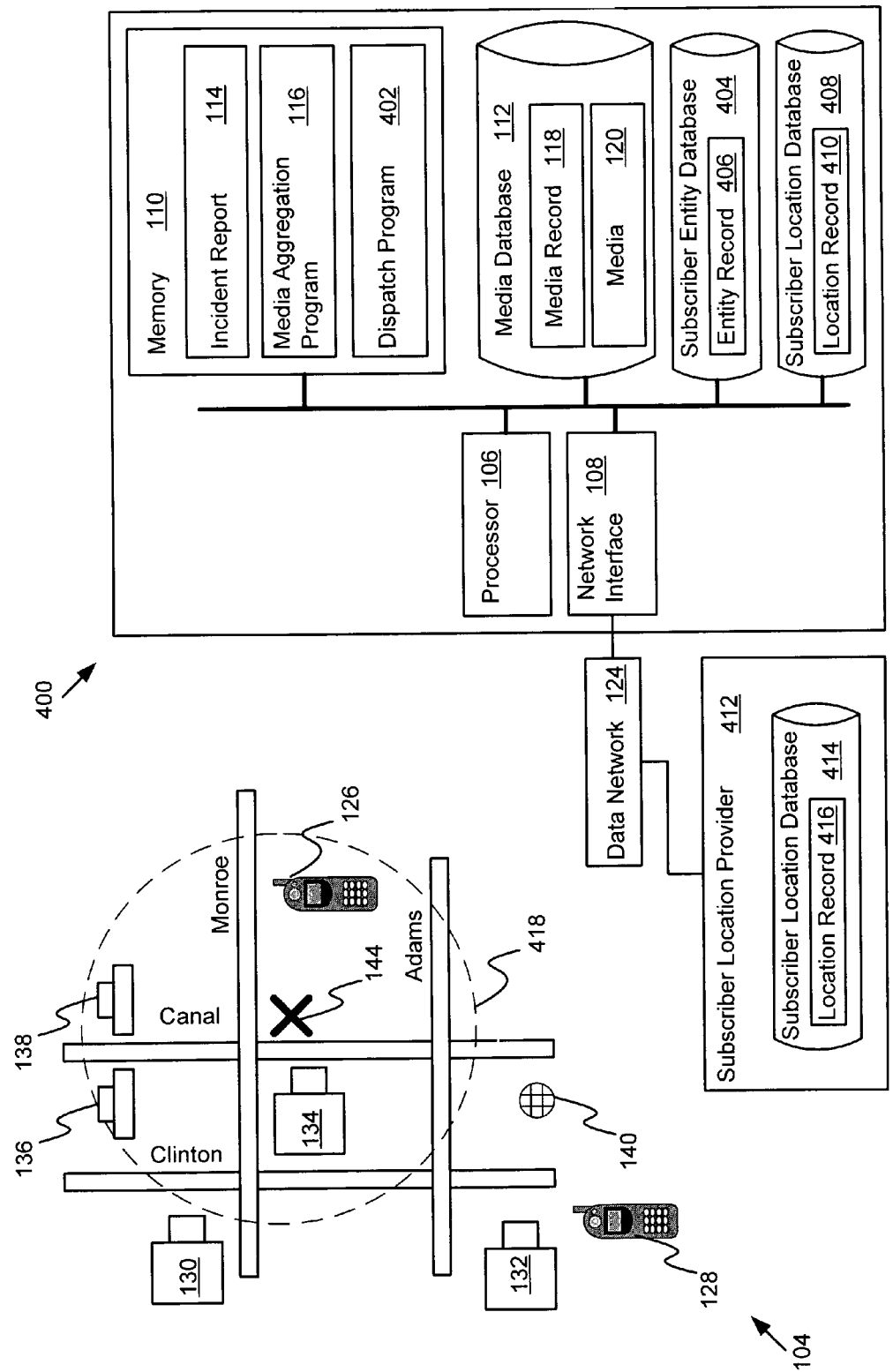
FIG. 4 illustrates a call center processing system, in communication with external networks and media sensors, that dispatches incident alerts to subscriber entities.

As shown in FIG. 4, the call center 400 may incorporate dispatch services. For example, the memory 110 may optionally incorporate a dispatch program 402, a subscriber entity database 404 that stores entity records 406, and a subscriber location database 408 that stores location records 410. Alternatively, the call center 100 may communicate over the external networks 102 to make inquiries to a subscriber location provider 412 that may itself maintain a subscriber location database 414 that stores location records 416. An incident coverage area 418 is illustrated that encompasses a geographical region around the incident location 144.

In operation, the call center 400 receives an incident report that sets forth pertinent information about the incident. Based on the incident information, the call center 400 may determine that an incident alert should be issued to subscriber entities. The call center 400 may make the determination based on the type of incident (e.g., a violent act that may automatically qualify for alerting), and optionally based on the types of incidents for which the subscriber entities have indicated that they should be alerted.

The call center 400 exercises control over which subscriber entities it will alert. For example, as shown in FIG. 4, the call center 400 may alert the subscriber entities in the incident coverage area 418. Although the incident coverage area 418 is shown as circular (i.e., defined by a pre-selected radius), the coverage area 418 may be more generally specified both in terms of size and shape. As examples, the incident coverage area 418 may be polygonal, arcuate, or bounded by a pre-selected number of streets, buildings, or other geographical features.

In order to determine which subscribers qualify for an incident alert, the call center 400 may search the subscriber entity database 404. The subscriber entity database 404 stores the entity records 406 that will be described in more detail below. Thus, in one implementation, based on the search results from the subscriber entity database 404, the call center 400 obtains a selection of subscriber entities for which to potentially send an incident alert.

Because, in one implementation, the alerting service is localized, the call center 400 determines the incident coverage area 418 with respect to the incident location 142. The incident coverage area may be different for each subscriber entity, or may be consistent among all subscriber entities.

Thus, the incident coverage area 418 serves as a boundary, within which subscriber entities may be alerted.

In order to determine whether any particular subscriber entity lies within the coverage area 418, the call center 400 may consult, for example, the subscriber location database 408. Alternatively, the call center 400 may communicate with the external subscriber location provider 412. In either case, the call center 400 queries a subscriber location database for a location record matching a particular subscriber entity. Because the location records are consistently updated with the subscriber location, the call center 400 may determine if the subscriber entity is within the coverage area 418.

Figures 5, 6, 7, 10:
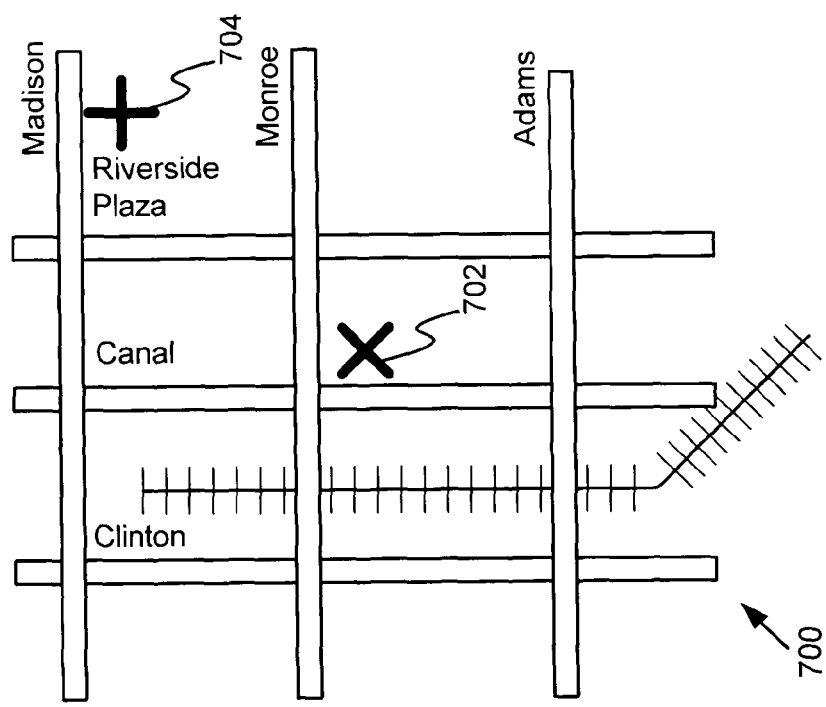
FIG. 5 shows an example of an entity record and a location record that the call processing system shown in FIG. 4 may create, retrieve, and process from associated databases.
FIG. 6 shows an example of an incident alert that the call processing system shown in FIG. 4 may prepare for transmission to subscriber entities within a coverage area.
FIG. 7 shows an example an incident map transmitted to a subscriber entity by the call center shown in FIG. 4.
FIG. 10 shows an example of a sensor activation instruction that the call processing system shown in FIG. 9 may prepare and transmit to external sensors.

Turning briefly to FIG. 5, that figure shows examples of an entity record 406 and a location record 410, 416. The entity record 406 incorporates information about a subscriber entity and their alerting preferences. In one implementation, the entity record 406 includes an entity ID field 502 and an alert parameters field 504.

The entity ID 502 provides an identifier for the subscribing entity. The entity ID 502 may be a name, address, identification number, serial number, or any other indicia that specifies a particular subscriber entity.

The alert parameters field 504 specifies alert constraints, preferences, or other considerations that apply to the subscribing entity. For example, the alert parameters field 504 may indicate the incident types to alert on, a desired coverage area 418, acceptable times for alerting the subscribing entity, what type of media to send to the subscribing entity, and other characteristics that tailor the alerting service to the subscribing entity.

The location record 410 includes information that physically places a subscriber entity. The location record 410 may include an entity ID field 506 and a location field 508. The entity ID field 506 may be implemented as noted above with regard to the entity ID 502.

The location field 508 includes position information that locates the subscribing entity. The location field 508 may, as examples, include GPS location coordinates, longitude and latitude data, address information, approximate triangulation coordinates based on cell phone use, or any additional information known about or provided by the subscribing entity (e.g., current on the 35th floor of an apartment building).

With regard again the FIG. 4, when the subscriber entity is within the coverage area 418, the call center 400 prepares and transmits an incident alert to the subscriber entity. To that end, the call center 400 may transmit data over the external networks 102, including, as examples, transmitting data via the radio data service (RDS) spectrum in the FM radio band, transmitting data packets through a computer network, or by transmitting data through an existing telephone infrastructure.

As shown in FIG. 4, a cell phone owner carrying the cell phone 126 is present in the coverage area 418. The call center 400 may therefore transmit an incident alert to the call phone 126 to alert the owner, for example, of a mugging that occurred nearby at Canal Street and Monroe Street. Note also that the security camera 134, the motion sensor 136, and the proximity detector 138 are also within the coverage area 418, and may also receive the incident alert if they too are subscriber entities. The subscriber entities need not be the same entities that provide media to the call center 100 or the call center 400.

Turning briefly to FIG. 6, that figure shows one example of an incident alert 600. The incident alert conveys information to the subscriber units within the coverage area 418 that is related to the incident reported to the call center 400. As shown in FIG. 6, the incident alert includes an entity ID field 602, an alert description field 604, and an alert media field 606.

The entity ID field 602 may be implemented as noted above with regard to the entity ID field 502. The entity ID field 602 thus serves, for example, as a verification to the recipient of whether the recipient was actually the intended receiver for the incident alert 600.

The alert description field 604 provides information characterizing the incident that gave rise to the incident alert 600. To that end, the alert description field 604 may include a text based description of the incident (e.g., "mugging alert", "hit and run at Canal and Monroe", "assault"), a graphical icon for the incident type, or any other explanatory description or indicia for the incident type.

The alert media field 606 delivers media to the subscriber entity from the media database 112. Thus, for example, the alert media field 606 encodes a picture taken by a cell phone, a series of such pictures, video frames, audio recordings, motion sensor activation indicators, or any other type of media received by and stored in the media database 112. As a result, a subscriber entity may obtain a wide variety of multimedia information related to the incident.

With regard to FIG. 7, that figure shows one particular example of the media delivered in the alert media field 606. More specifically, FIG. 7 shows an incident map 700. The incident map 700 depicts the area around the incident, and locates the incident using the location icon 702. Optionally, the incident map 700 may also display the approximate subscriber location 704. As a result, the subscriber unit gains a visual understanding of where the incident has occurred, and may take appropriate action.

Figure 8:
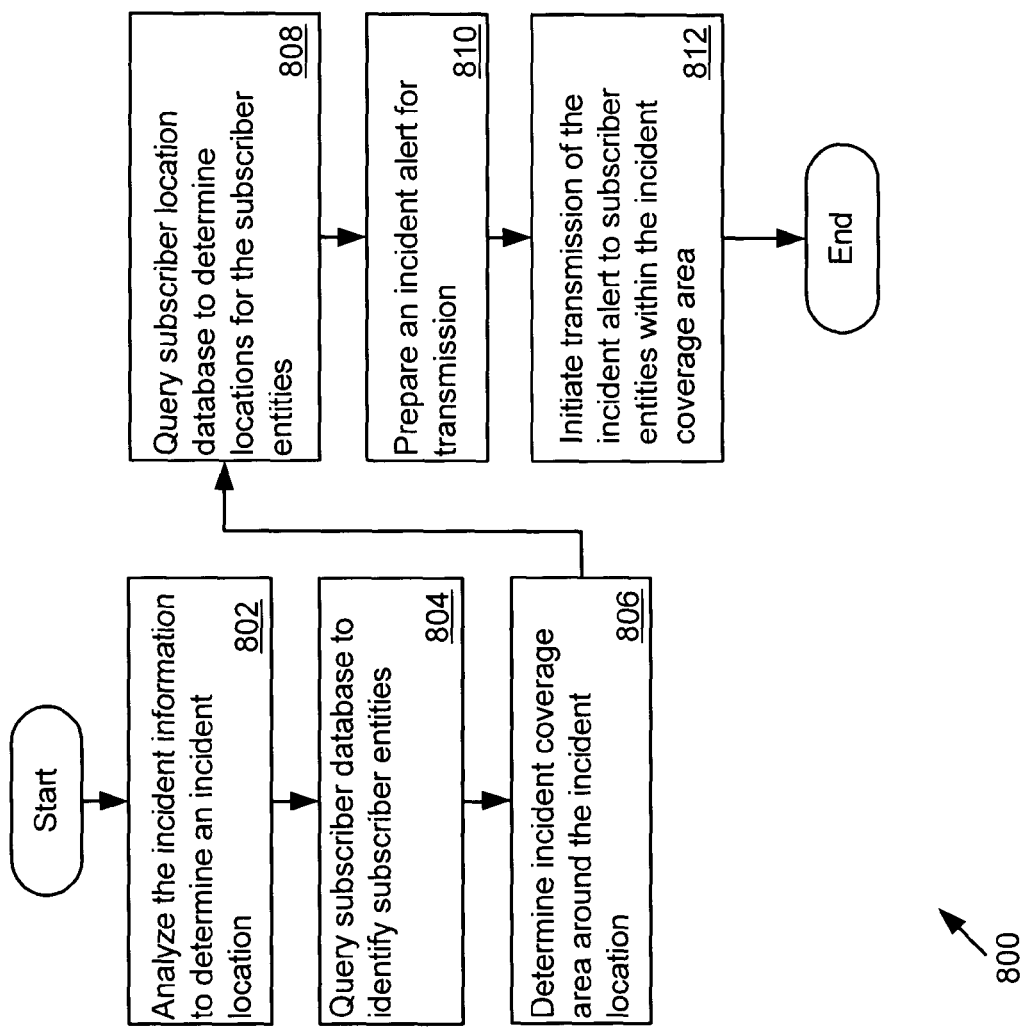
FIG. 8 shows a flow diagram of the steps taken the dispatch program executed by the call center processing system shown in FIG. 4.

FIG. 8 provides a flow diagram 800 that summarizes the steps taken by the dispatch program 402 when providing the incident alerting service. The dispatch program 402 analyzes incident information to determine an incident location 144 (Step 802). The dispatch program 402 then queries the subscriber entity database 404 to identify subscriber entities that may receive an incident alert (Step 804).

In addition, the dispatch program 402 determines an incident coverage area 418 around the incident location 144 (Step 806). The incident coverage area 418 may be a pre-configured parameter stored in the memory 110, an operator selectable parameter, or may be specified by each subscriber entity. For localized alerts, the coverage area 418 may encompass 1 to 100 square miles, 1-50 square miles, 1-10 square miles, 1-2 square miles, or another localized area.

The dispatch program 402 also determines where subscriber entities are located, and whether they are within the coverage area 418 (e.g., by querying the subscriber location provider 412) (Step 808). When there are subscriber entities within the coverage area 418 that are selected to receive an incident alert for the incident reported in the incident information, the dispatch program 402 proceeds to prepare an incident alert 600 (Step 810) and subsequently initiates its transmission (Step 812).

Contextual Media Capture, Aggregation

Figure 9:
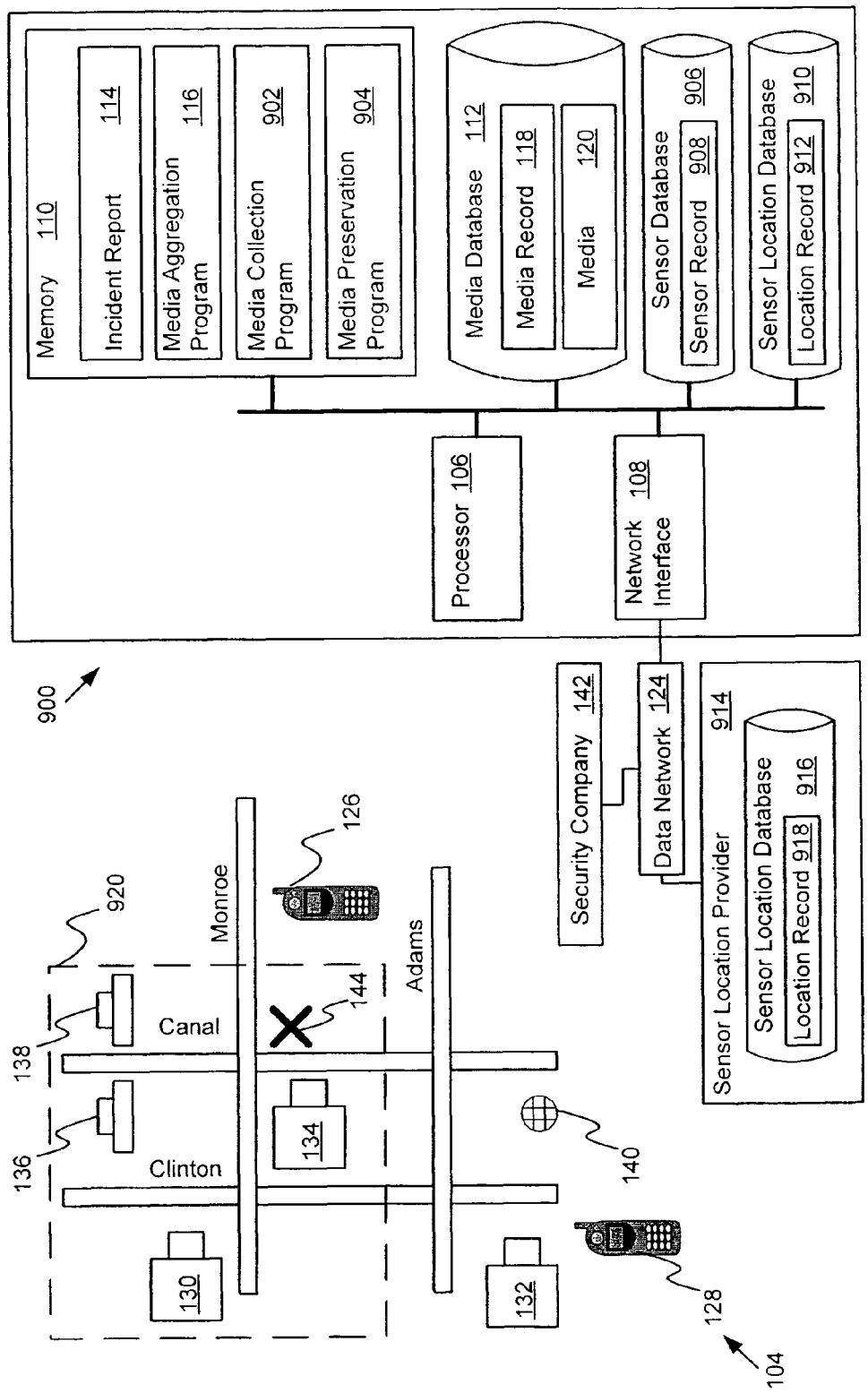
FIG. 9 illustrates a call center processing system, in communication with external networks and media sensors, that collects and preserves supplemental media from sensors external to the call center processing system.

FIG. 9 illustrates a call center processing system 900, in communication with external networks and media sensors, that collects and preserves supplemental media from sensors external to the call center processing system 900. The call center 900 includes a media collection program 902 and a media preservation program 904 executing from the memory 110.

In addition, the call center 900 includes a sensor database 906 that stores sensor records 908, and a subscriber location database 910 that stores location records 912. Alternatively, the call center 900 may communicate over the external networks 102 to make inquiries to a sensor location provider 914. The sensor location provider 914 may itself maintain a sensor location database 916 that stores location records 918. Furthermore, the call center 900 may communicate, as explained below, with one or more third party sensor control entities such as the security company 142. FIG. 9 also illustrates a sensor coverage area 920 that encompasses a geographical region around the incident location 144.

In operation, the call center 900 receives an incident report that sets forth pertinent information about an incident that has occurred. Based on the incident information, the call center 900 may determine that selected external sensors should be activated. The external sensors may then either transmit their media to the call center 900, or have their media preserved as explained below. In a manner similar to the call center 400 in FIG. 4, the call center 900 may make the determination based on the type of incident (e.g., a violent act), incident location, or other pre-selected criteria.

With regard to collecting additional media, the call center 900 selectively activates external sensors or requests media from additional sensors. For example, as shown in FIG. 9, the call center 900 may activate one or more of the sensors 130, 134, 136, and 138 that are positioned in the sensor coverage area 920. Although the sensor coverage area 920 is shown as rectangular, the coverage area 920 may be more generally specified both in terms of size and shape. As examples, the sensor coverage area 920 may be polygonal, arcuate, or bounded by a pre-selected number of streets, buildings, or other geographical features.

In order to determine which sensors to activate and from which to collect media, the call center 900 may search the sensor entity database 906. The sensor database 906 stores the sensor records 908. The sensor records 908 may take the same or similar form as the entity records 406. In other words, the sensor records 902 may identify a sensor (e.g., by location, IP address, serial number, and the like), and provide collection parameters that specify the capabilities of the sensor, as explained above with regard to FIG. 2. Accordingly, in one implementation, based on the search results in the sensor database 906, the call center 900 may obtain a selection of sensors (e.g., the cameras 130 and 134) from which to collect supplemental media or to instruct to preserve their media.

Because the media collection is localized, in one implementation, the call center 900 determines the sensor coverage area 920 with respect to the incident location 142. The sensor coverage area 920 may be different for each sensor, or may be consistent among all sensors. The sensor coverage area 920 may be a pre-configured parameter stored in the memory 110, an operator selectable parameter, or may be specified by each sensor. For localized collection, the sensor area 920 may encompass 1 to 100 square miles, 1-50 square miles, 1-10 square miles, 1-2 square miles, or another localized area. Thus, the sensor coverage area 920 serves as a boundary, within which additional media may be collected from sensors.

In order to determine whether any particular sensor lies within the sensor coverage area 920, the call center 900 may consult, for example, the sensor location database 910. Alternatively, the call center 900 may communicate with the external sensor location provider 914. In either case, the call center 900 queries a subscriber location database for a location record matching a particular sensor. Because the location records are consistently updated with the sensor location (and many sensors will never move), the call center 900 may determine if the sensor is within the sensor coverage area 920.

The location records 912 and 918 may provide the same or similar information as the location records 410 and 416 shown in FIG. 4 and shown in more detail in FIG. 5. Thus, the location records 912 and 918 serve to physically locate each sensor represented in the sensor database 906.

In some instances, the sensors may provide supplemental media directly to the call center 900 through the external networks 102. However, in other instances the security company 142 may instead forward the media obtained from the sensors to the call center 900. Thus, the call center 900 may selectively transmit a sensor activation instruction directly to the sensors, to the security company 142, or both. The security company 142 may locally process the activation instruction and take the requested action, or may in turn forward the activation instruction to the sensors.

Turning briefly to FIG. 10, that figure shows one example of a sensor activation instruction 1000. As illustrated, the sensor activation instruction 1000 includes a sensor ID field 1002, and a capture parameters field 1004. In a manner similar to the entity ID field 602, the sensor ID field 1002 may serve, for example, as a verification to the sensor that it was actually the intended receiver for the sensor activation instruction 1000.

The capture parameters field 1004 provides information characterizing the nature and extent of the media that the call center 900 is requesting the sensor to provide. As examples, the capture parameters field 1004 may specify that a video camera should turn on and begin transmitting video footage, that a microphone sensor should activate and transmit sampled audio back to the call center 900, or that the sensor should otherwise activate and perform a sensing operation. The capture parameters field 1004 may further specify a duration for the media capture or the delivery of media already obtained. The capture parameters field 1004 may also specify the resolution, sampling rate, image capture rate, camera angle, panning sweep angle, or other media acquisition parameters for the sensor of interest.

Supplemental media, transmitted by sensors, arrives at the call center 900. In response, the call center 900 receives the supplemental media, obtains a characterization of the media, and stores the supplemental media in the media database 112 as described above, for example, with respect to FIGS. 1-3. Thus, the call center 900 acts to automatically aggregate media that may relate to a reported incident, and stores the media in a conveniently accessible and searchable form in the media database 112.

Figure 11:
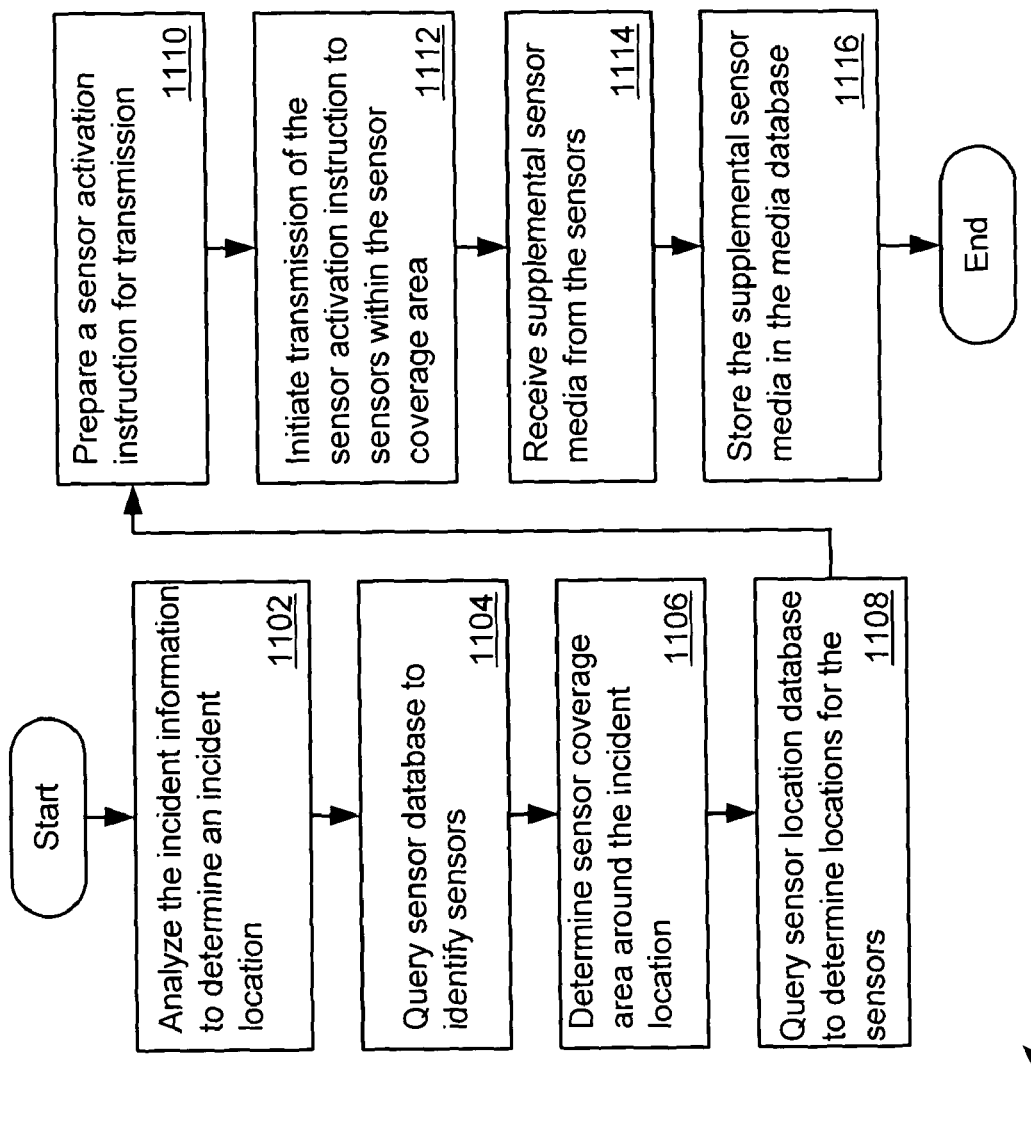
FIG. 11 shows a flow diagram of the steps taken the media collection program executed by the call center processing system shown in FIG. 9.

FIG. 11 provides a flow diagram 1100 that summarizes the steps taken by the collection program 902 when collecting supplemental media. The collection program 902 analyzes incident information to determine an incident location 144 (Step 1102). The collection program 902 then queries the sensor database 906 to identify sensors that may be able to provide additional media relating to the incident (Step 1104).

In addition, the collection program 902 determines a sensor coverage area 920 around the incident location 144 (Step 1106). The collection program 902 also determines where the sensors are located, and whether they are within the coverage area 920 (e.g., by querying the sensor location database 910) (Step 1108). When there are sensors within the coverage area 920 that are selected to provide supplemental media, the collection program 902 proceeds to prepare a sensor activation instruction 1000 (Step 1110) and subsequently initiates its transmission (Step 1112).

The call center 900 also processes the supplemental media received from the sensors. Accordingly, the collection program 902 may receive the supplemental media (step 1114) and store the supplemental media in the media database 112

(Step 1116). In one implementation, the collection program 902 may itself perform these operations, while in other instances, the media aggregation program 116 may perform the reception, indexing, and storage operations.

Media Preservation

Additionally or alternatively, the call center 900, using the media preservation program 904, may act to preserve media that might otherwise be discarded, destroyed, overwritten, or otherwise lost. In this aspect, the call center 900 may optionally employ a localized preservation coverage area that differs from the sensor coverage area 920. For example, the call center 900 may use a preservation coverage area that encompasses more sensors so that additional supplemental media is preserved for future analysis.

Figure 12:
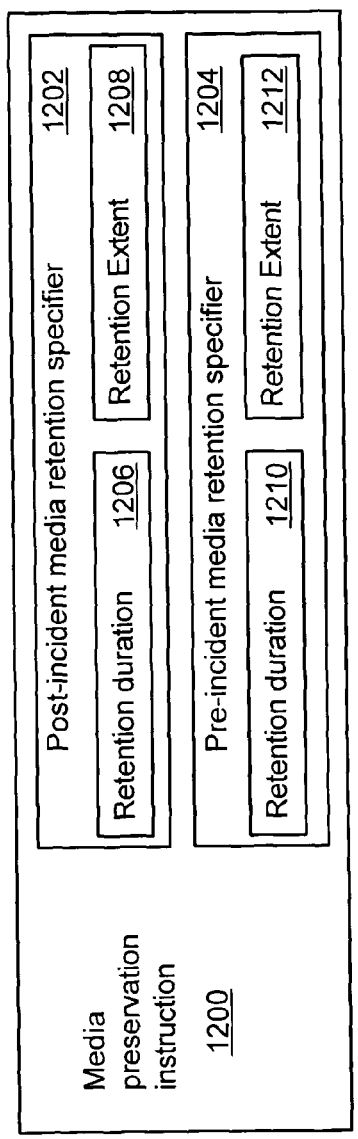
FIG. 12 illustrates an example of a media preservation instruction that the call processing system shown in FIG. 9 may prepare and transmit to external sensors.

To that end, instead of or in addition to transmitting a sensor activation instruction 1000, the call center 900 may transmit a media preservation instruction. Turning briefly to FIG. 12, that figure shows one example of a media preservation instruction 1200.

As illustrated, the preservation instruction 1200 includes a post-incident media retention specifier 1202 and a pre-incident media retention specifier 1204. The post-incident media retention specifier 1202 includes a retention duration 1206 and a retention extent 1208. Similarly, the pre-incident media retention specifier 1204 includes a retention duration 1210 and a retention extent 1212. The post-incident media retention specifier 1202 sets forth conditions on retention of media acquired by a sensor after the incident occurrence, while the pre-incident media retention specifier 1204 sets forth conditions on retention of media acquired by a sensor before the incident occurrence.

Each of the retention durations 1206 and 1210 specifies, for example, a duration (e.g., an amount of time) that the sensor should retain the media recorded by the sensor. Alternatively, the preservation program 904 may transmit the preservation instruction 1200 to the security company 142 or any other entity responsible for the sensors 126-140. The retention durations 1206 and 1210 may be expressed in terms of a number of months, weeks, days, hours, sample periods, frames, or any other unit or duration. The duration may be an absolute measure, or relative to a specific time and date (e.g., the incident time and date) also provided in the preservation instruction 1200.

For example, if the retention duration 1206 is 3 days and 12 hours, then the preservation instruction informs the sensor to retain the media that it obtained after the incident occurred for at least 3 days at 12 hours. Similarly, if the retention duration 1210 is 1 week, then the preservation instruction informs the sensor to retain the media that it obtained before the incident occurred for at least 1 week.

In addition to the retention duration, the preservation instruction may also specify the extent (e.g., quantity or length) of media to retain. An extent may be specified in terms of time, samples, images, sensor readings, or any other measure. For example, if the retention extent 1208 is 20 minutes, then the preservation instruction has informed the sensor to retain fifteen minutes of media that it obtained after the incident occurred. Continuing the example above, the sensor will retain those 20 minutes for at least 3 days at 12 hours. Similarly, if the retention extent 1210 is 320 samples, then the preservation instruction has informed the sensor to retain 320 samples (e.g., audio samples, still images, or frames of video) of the media that it obtained before the incident occurred. Continuing the example above, the sensor will retain the 320 samples for at least 1 week.

Figure 13:
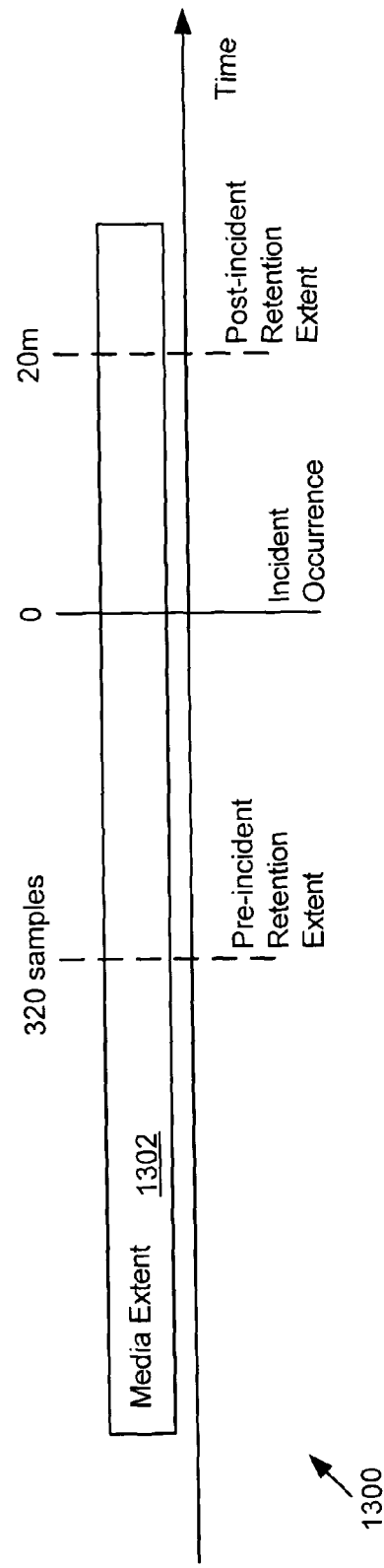
FIG. 13 shows a media time line including a media extent and selected post-incident and pre-incident retention extents.

Turning briefly to FIG. 13, that figure illustrates a timeline 1300 graphically illustrating the application of the retention extents 1208 and 1212 to media captured by a sensor. Specifically, FIG. 13 shows the time extent 1302 of media captured by, for example, the security camera 132. The incident occurrence time is labeled as time 0. As shown, the post-incident retention extent (specified in a preservation instruction) is 20 minutes of video, while the pre-incident retention extent (also specified in the preservation instruction) is 320 frames.

Figure 14:
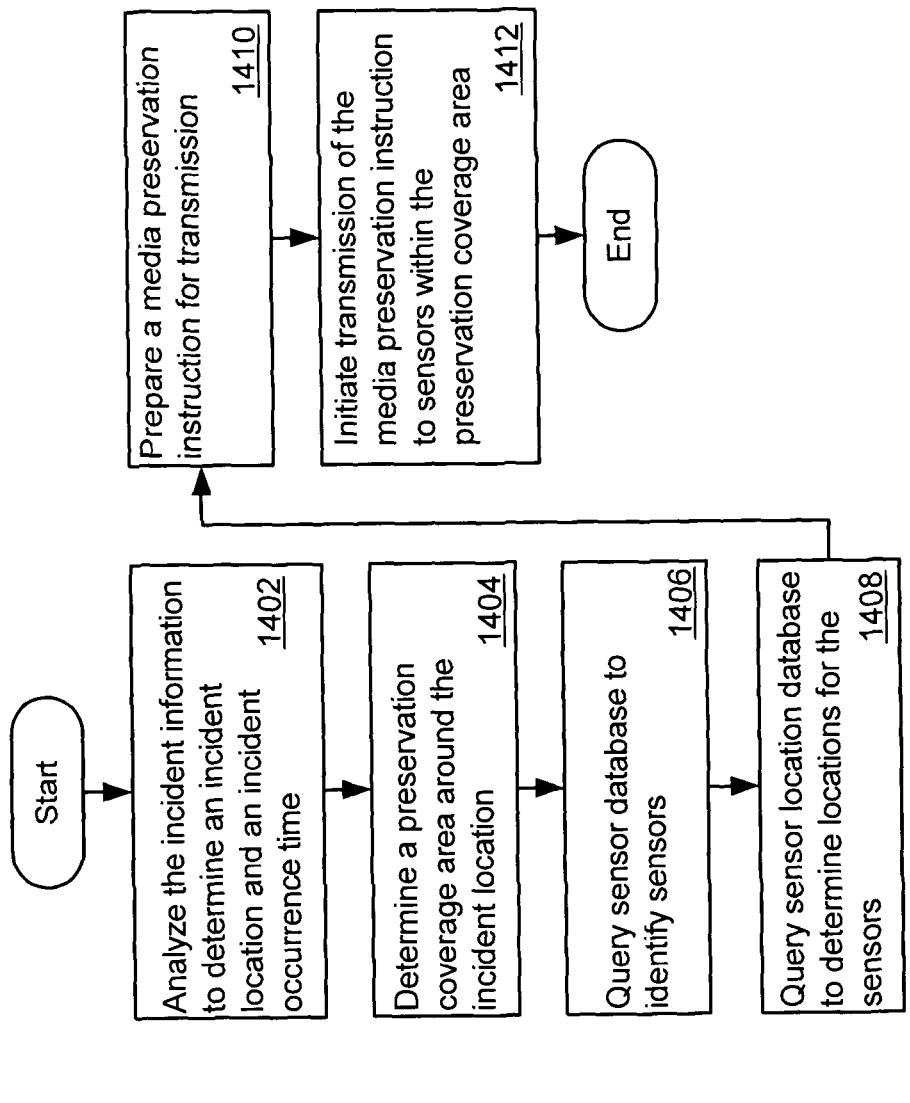
FIG. 14 shows a flow diagram of the steps taken the media preservation program executed by the call center processing system shown in FIG. 9.

FIG. 14 provides a flow diagram 1400 that summarizes the steps taken by the preservation program 904 when preserving media that may be useful in analyzing incidents. The preservation program 904 analyzes incident information to determine an incident location 144 (Step 1402). In addition, the preservation program 904 determines a preservation coverage area around the incident location 144 (Step 1404).

The preservation program 904 then queries the sensor database 906 to identify sensors that may have worthwhile media recordings relating to the incident (Step 1406). The preservation program 904 also determines where the sensors are located, and whether they are within the preservation area (e.g., by querying the sensor location database 910) (Step 1408).

When there are sensors within the preservation coverage area, the preservation program 904 proceeds to prepare a preservation instruction 1200 (Step 1410). The preservation program 904 subsequently initiates transmission of the preservation instruction (Step 1412).

Call Center User Interface

Figure 15:
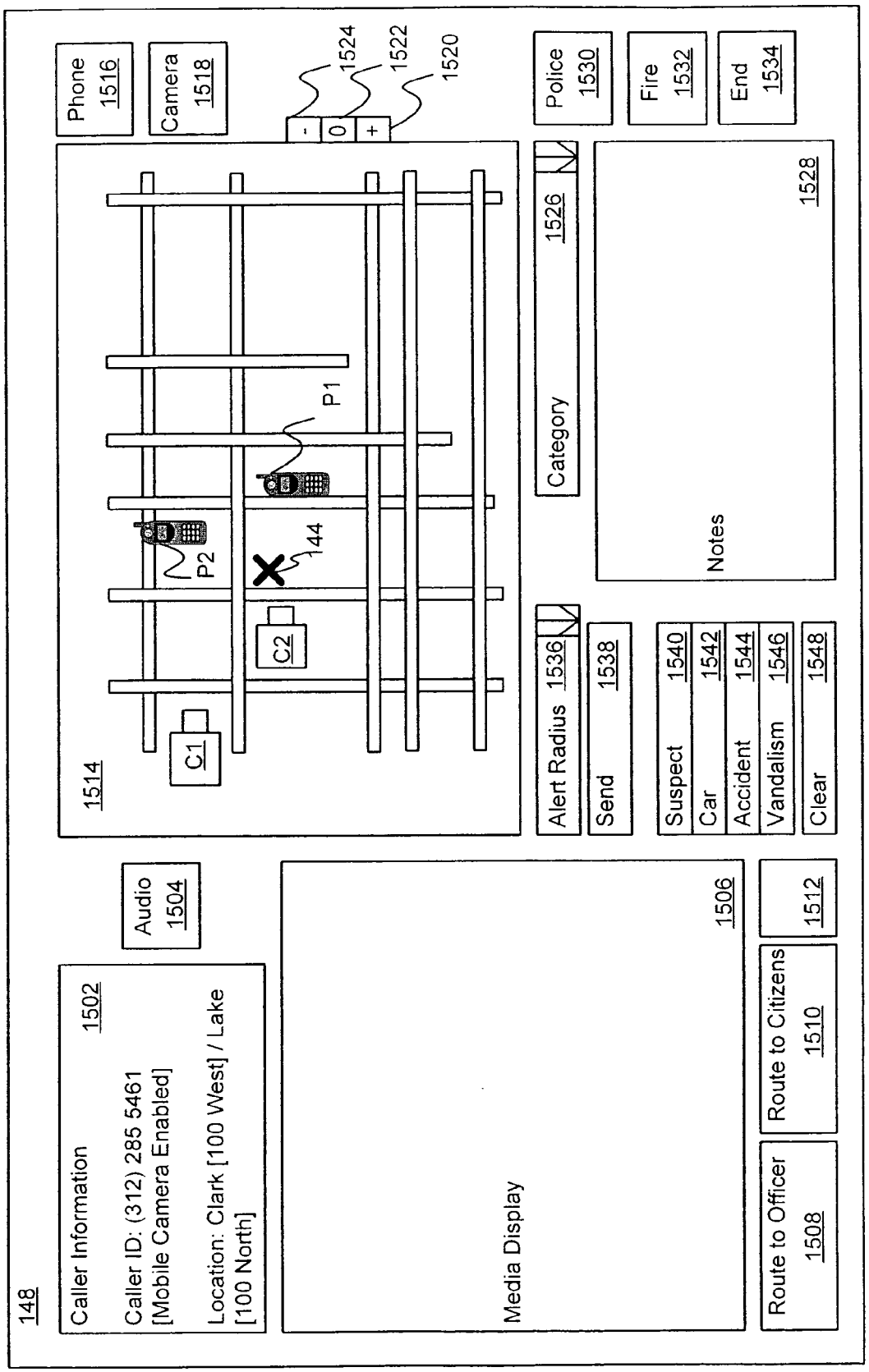
FIG. 15 depicts a call center user interface that may be implemented by the call center processing systems shown in FIGS. 1, 4, and 9.

As noted above with reference to FIG. 1, the call centers may include a user interface 148 to aid in the operation of any of the functions described above. Turning to FIG. 15, that figure shows one example of the user interface 148. The user interface 148 includes a third party information window 1502, an audio playback button 1504, and a media display window 1506. The user interface 148 also includes routing buttons including an officer routing button 1508 and a citizen routing button 1510. A media description text box 1512 provides a time, date, location, and general media information display.

In addition, the user interface 148 includes a map display 1514, and locator controls including a cell phone display button 1516 and a security camera display button 1518. The map display 1514 includes sensor location indicia for two security cameras labeled C1 and C2, and for two cell phones labeled P1 and P2. The zoom in, zoom reset, and zoom out buttons 1520, 1522, and 1524 control the zoom level of the map display 1514.

An incident category button 1526 and an incident description text box 1528 are also present. The user interface 148 includes a police notification button 1530 and a fire department notification button 1532, as well as an end-call button 1534. An alert radius selection button 1536 and a send-alert button 1538 are provided, as are characteristic buttons, including the fleeing suspect button 1540, fleeing car button 1542, car accident button 1544, and a vandalism button 1546. A clear description button 1548 is additionally present.

The third party information window 1502 displays information about the present caller or media sensor providing media to the call center. As examples, the information window 1502 may display call identification and location data. The audio playback button 1504 provides a convenient mechanism for playing any audio portion of the media that is arriving, while the media display window 1506 displays images, video, or other sensor readings obtained from an image sensor. For example, the media display window 1506 may display the images captured by a digital camera enabled cell phone.

The officer routing button 1508 provides an interface that allows the call center operator to immediately transmit information about the current incident to a police officer. Similarly, the citizen routing button 1510 provides a mechanism that allows the call center operator immediately transmit an incident alert to subscriber entities. As noted above, the media description text box 1512 provides a time, date, location, and media information display for the current incident and its associated media.

The map display 1514 provides a window in which a local map (with respect to the incident location 144 or any other selected address or coordinate) may be displayed, including location indicia specifying the incident location 144, and sensor location indicia such as the camera icons C1 and C2 and the cell phone icons P1 and P2. The sensor indicia may be displayed or removed from the map display 1514 by using the cell phone display button 1516 and the security camera display button 1518. As explained above, the Zoom in button 1520, Zoom reset button 1522, and the Zoom out button 1524 controls the zoom level of the map display 1514.

An incident category button 1526 provides a drop down list that may be employed to select pre-defined incident types (e.g., robbery, mugging, and the like) for the incident. The incident description text box 1528 provides an additional mechanism for specifying incident information and allows free form entry, for example, of a text description of the incident. When the incident warrants, the operator may dispatch the incident information and related media directly to a police station using the police notification button 1530, or directly to the fire department using the fire department notification button 1532. The end-call button 1534 provides an interface button that allows the operator to end the current incident call.

An alert radius selection button 1536 allows the operator to select an incident coverage area (in this determined by a radius selection), while the send-alert button 1538 initiates alerting subscriber entities as explained above with respect to FIG. 4-8. The user interface 148 allows the operator to specify additional incident information using the characteristic buttons, including the fleeing suspect button 1540, fleeing car button 1542, car accident button 1544, vandalism button 1546. The clear description button 1548 resets the characteristic information in the text box 1528 and the settings chosen by the characteristic buttons 1540-1546.

The user interface 148 shown in FIG. 15 provides one example of wide variety of designs that may be employed to ease interaction between the operator and the call center. Generally, the user interface 148 may be freely modified for any given implementation. For example, additional or fewer text boxes, drop down lists, selection buttons may be incorporated into the user interface 148 in order to configure the user interface 148 for any particular application.

Investigation Tool

The media collection, aggregation, and preservation functions of the call center provide significant enhancements to receiving, processing, and communicating incident reports. A further extension of the call center provides searching and authoring capabilities in the form of an investigation tool.

Figure 16:
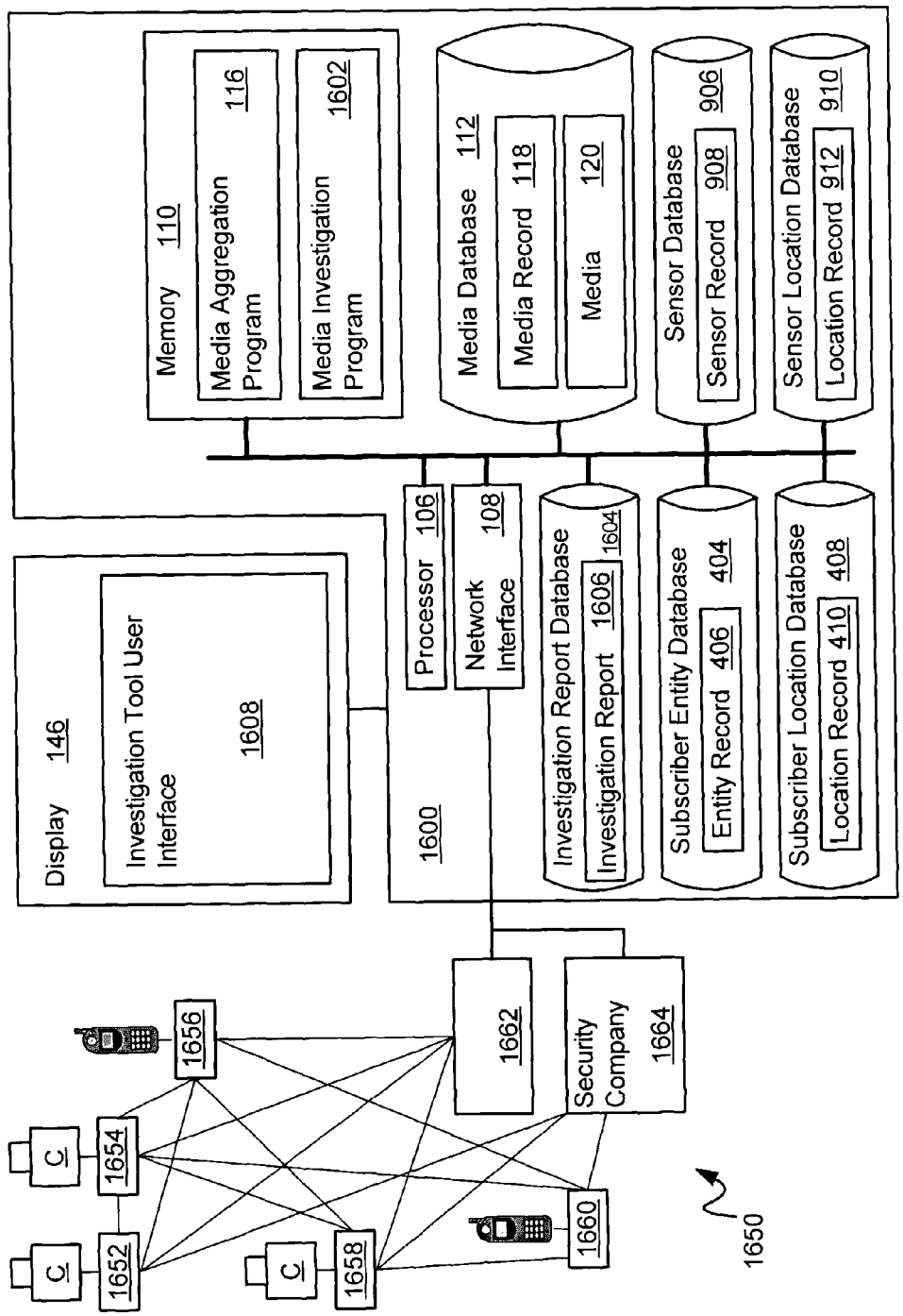
FIG. 16 illustrates a call center investigation tool that may be used to interface to the media, sensor, and subscriber entity databases and provide search and report generation capability.

Turning to FIG. 16, that figure shows one example implementation of an investigation tool 1600. The investigation tool 1600, as shown, leverages the hardware and databases already present in the call center. Thus, the investigation tool, in one implementation, includes the processor 106, the network interface 108, and the memory 110. The memory 110 includes the media investigation program 1602, and optionally the other programs noted above, for example, the media aggregation program 116. The investigation program 1602 interacts with the operator and an investigation report database 1604 to prepare investigation reports 1606.

Additionally, the media database 112 is present, and includes the media records 118 and media 120. The investigation tool 1600 may also draw upon the resources provided by the subscriber entity database 404 as well as the subscriber location database 408. Similarly, the investigation tool 1600 may employ the sensor database 906 and the sensor location database 910 in operation. Generally, any of the databases 112, 906, 910, 404, 408 may be maintained offsite by a third party provider, or may be maintained locally, integrated into the investigation tool 1600.

In operation, the investigation tool 1600 retrieves and presents media histories and builds investigation reports. To that end, the investigation tool 1600 may retrieve and present chronological histories of delimited geographic areas by a selected region, filter by event types, entities of interest, and time range, as well as present the relevant information chronologically. Generally, the media investigation program 1602 coordinates the activities of the investigation tool 1600, and in response to operator input, prepares, presents, and stores the investigation reports 1606.

A display 146 provides a visual interface for the investigation tool 1600 operator. In that capacity, the display 146 presents the investigation tool user interface 1608. The user interface 1608 is described in more detail below with regard to FIG. 17, and is accompanied by a discussion of how the investigation tool 1600 responds to the user interface 1608.

Figure 17:
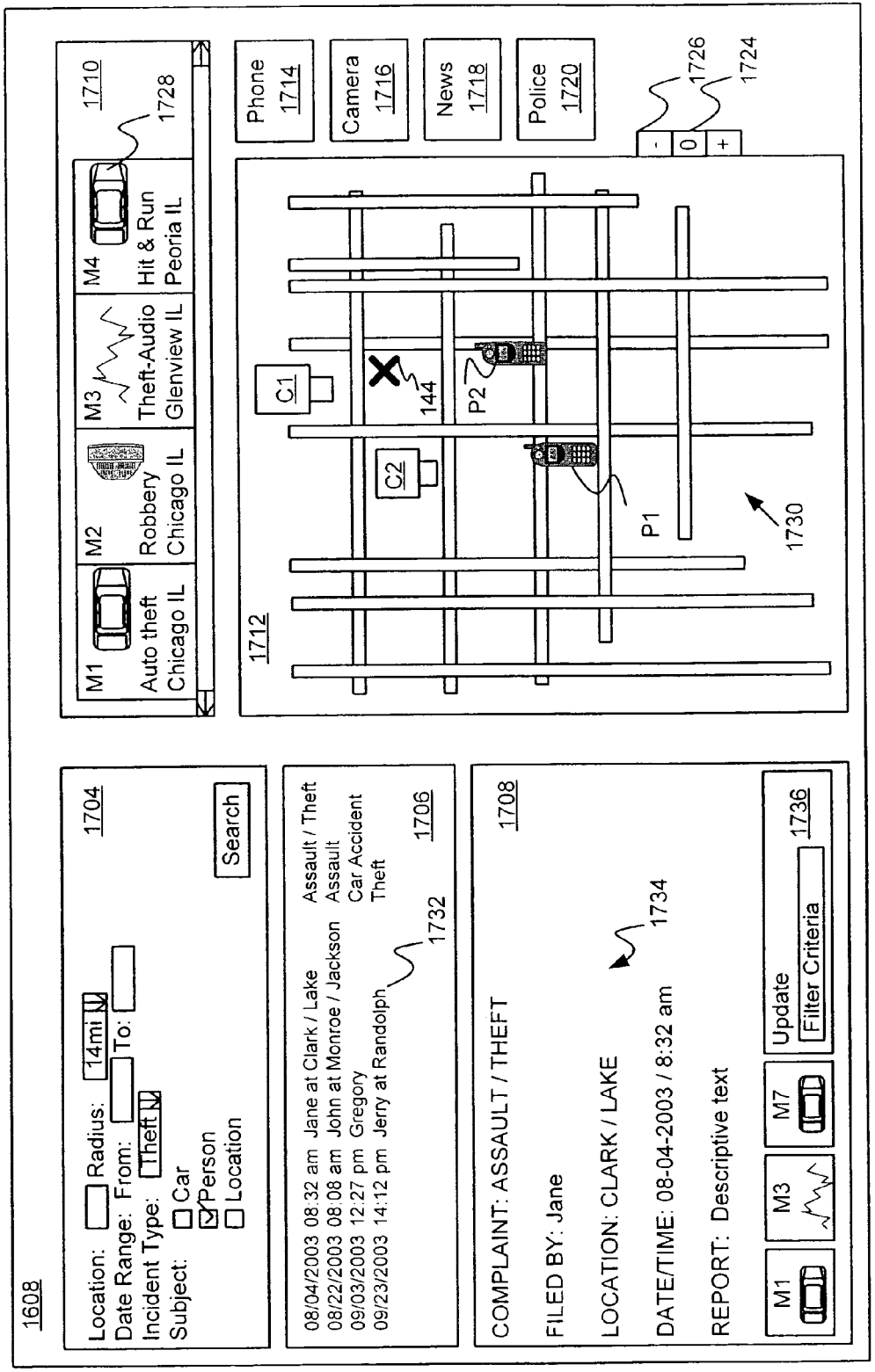
FIG. 17 shows a call center investigation tool user interface that may be implemented by the call center investigation tool shown in FIG. 16.

As shown in FIG. 17, the user interface 1608 includes a search window 1704, a report match window 1706, and a report authoring window 1708. In addition, the user interface 1608 includes a media selection window 1710 and a map display window 1712. Additionally, locator icons are also present, and include a call phone display button 1714, a security camera display button 1716, a news media display button 1718, and a police display button 1720. Zoom in, zoom reset, and zoom out buttons 1722, 1724, and 1726 control the zoom level of the map display 1712.

The search window 1704 accepts incident search parameters as a precursor to initiating an incident search in the media database 112. In this example, the search parameters include a location parameter, a coverage area parameter (shown in FIG. 17 as a radius drop down list), and a temporal parameter (shown in FIG. 17 as the date range). The search parameters further include an incident type parameter (shown in FIG. 17 as a selectable checklist of incident types). The Search button initiates the incident search in the media database 112.

When the operator activates the Search button, the investigation program 1602 initiates a search for matching media in the media database 112. The search results are presented in the media selection window 1710. The media selection window 1710 provides a selection interface that the operator interacts with to select and view media, as well as add media to an investigation report. To that end, the media selection window 1710 displays a media record indicia for each matching piece of media in the media database 112. On example is labeled as the media record indicia 1728. The media record indicia provides a convenient visual representation for the media, and may be, as examples, a thumbnail image of a digital picture or a video frame, a waveform representing an audio recording, or any other type of visual cue.

As shown in FIG. 17, the media match M1 represents a digital camera image of an auto theft incident in Chicago Ill. Similarly, media match M2 is a security camera video of a robbery in Chicago Ill., while media match M3 represents an audio recording from a microphone nearby a theft incident in Glenview Ill. The media match M4 represents a cell phone camera image of a hit and run incident in Peoria Ill.

Note also that the investigation program 1602 populates the report match window 1706. In other words, the report match window 1706 includes individual selectable report entries 1732 that represent investigation reports 1606 that match the search parameters entered in the search window 1704. The operator may optionally select one of the report entries 1732 to edit, or to employ as the basis for a new investigation report 1606.

In that regard, the user interface 1608 also includes the report authoring window 1708 as an investigation report interface. The authoring window 1708 accepts report components 1734 including text entries, voice annotations, media attachments and other information that may be used to create an explanation, interpretation, statement, account, or description of an incident. For example, as shown in FIG. 17, the operator has selected the media M1, M3, and M7 and inserted that media as report components in the authoring window 1708. FIG. 17 also shows an automatic update report component 1736, including an automatic update filter that specifies match criteria. The match criteria may be the same or different than the incident search parameters. When an automatic update report component is present, the investigation program 1602 applies the filter against newly submitted media classification and characteristic information. Matching submitted media is then automatically associated with the investigation report. The filters may be maintained in a separate index for convenient access.

The user interface 1608 may also include Save/Load interface components that allow the operator to store and retrieve selected investigation reports 1606.

The map display window 1712 provides a window in which a local area map 1730 may be displayed, including indicia indicating the incident location 144 for any selected media record indicia. In addition, in response to operator selection of a locator icon 1714-1720, the investigation program 1602 displays location indicia on the area map to illustrate where particular sensors, individuals, or other entities were located during the incident.

As one specific example, the investigation program 1602 displays the camera cell phone indicia P1 and P2 on the area map 1730 when the locator icon 1714 is selected. The indicia P1 and P2 thus represent the location of individuals with camera enabled cell phones during an incident represented by a selected media record in the media selection window 1710. Similarly, the investigation program 1602 displays the video camera indicia C1 and C2 on the area map 1730 when the locator icon 1716 is selected.

The magnification of the area map 1712 may be adjusted, or the area map 1712 may be scrolled or re-centered using additional buttons on the user interface 1606. For example, the Zoom in button 1722, Zoom reset button 1724, and the Zoom out button 1726 will control the zoom level of the map display 1712.

The user interface 1606 shown in FIG. 17 provides one example of wide variety of designs that may be employed to ease interaction between the operator and the investigation tool 1600. Generally, the user interface 1606 may be freely modified for any given implementation. For example, additional or fewer text boxes, drop down lists, or selection buttons may be incorporated into the user interface 1606 in order to configure the user interface 1606 for any particular application.

Figure 18:
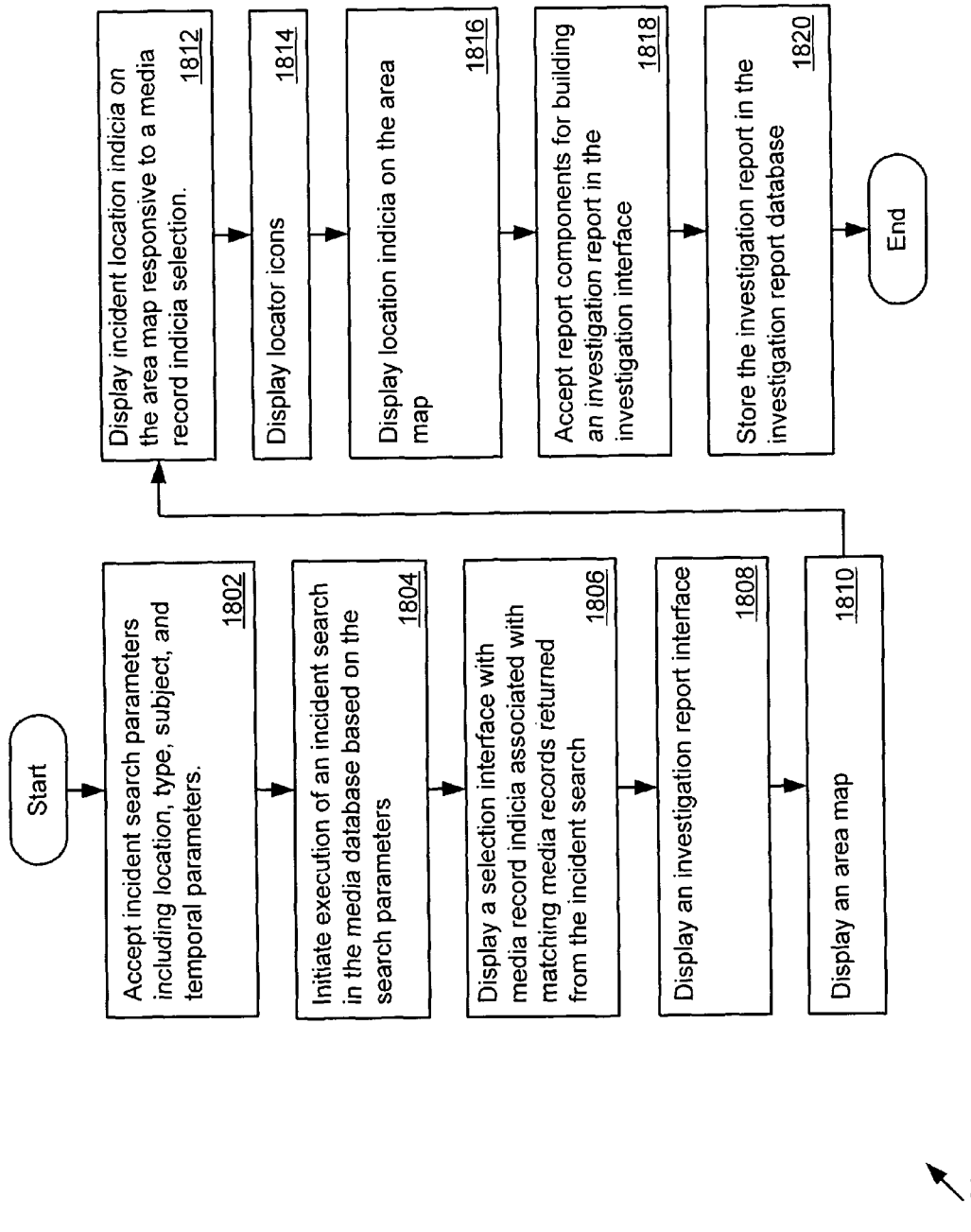
FIG. 18 shows a flow diagram of the steps taken the media investigation program executed by the call center instigation tool shown in FIG. 16.

Turning next to FIG. 18, that figure shows a flow diagram 1800 of the steps taken the media investigation program 1602 executed by the call center instigation tool shown in FIG. 17. The investigation program 1602 accepts incident search parameters including, as examples, incident location, type, subject, and time or date (Step 1802). An incident search is initiated based on the search parameters (Step 1804). Responsive to the search, the investigation program 1602 displays a selection interface (e.g., the media selection window 1710) that includes media record indicia 1728 associated with matching media records returned from the incident search (Step 1806).

In addition, the investigation program 1602 displays an investigation report interface (e.g., the report authoring window 1708) (Step 1808) in preparation for building an investigation report 1606. The investigation program 1602 also displays, based on a media record indicia selection, an area map (Step 1810) that shows the geographical region near a selected incident, and the incident location indicia 144 (Step 1812).

Furthermore, the investigation program 1602 also displays the locator icons 1714-1720 on the user interface 1606 (Step 1814). Thus, the investigation program 1602 may respond to the locator icons 1714-1720, for example, to display sensor indicia (P1, P2, C1, C2) on the area map (Step 1816). The sensor indicia may thus help the operator locate where sensors were located that submitted supplemental media to the call center.

Through the report interface, the investigation program 1602 accepts report components for building an investigation report 1606 (Step 1818). The report components may include text, video, audio, sensor readings, or any other type of media present in the media database 112. Thus, the investigation report 1606 may provide a multi-media presentation that describes, records, explains, or otherwise annotates an incident.

At any point, the operator may choose to save the incident report. In response, the investigation program 1602 stores the investigation report in the investigation report database 1604. The investigation report may be subsequently retrieved, viewed, and edited.

In certain instances, the call centers and investigation tool may communicate, through the network infrastructure interface 108, with ad-hoc sensor networks. An ad-hoc sensor network includes a loose connection of sensors that may pass data between nodes in the sensor network, yet that may or may not bear any relation to one another, operate under common control, or under common conditions. Returning to FIG. 16, that figure shows one example of an ad-hoc sensor network 1650.

The ad-hoc sensor network 1650 includes intermediate nodes 1652, 1654, 1656, 1658, 1660, and two principal nodes 1662 and 1664. The principal node 1654 may represent a gateway between the remaining intermediate nodes 1652, and another entity, for example, the investigation tool. There may be any number of intermediate nodes 1652 and principal nodes 1654, and they may be implemented in a variety of manners, including as receive and relay nodes, network traffic processing systems, gateways, routers, and the like.

While the investigation tool 1600 and the call centers 100, 400, 900 are particularly useful in emergency service and law enforcement environments, their capabilities renders them suitable for many different fields, business areas, and processes. More generally, the investigation tool 1600 and the call centers 100, 400, 900 may be employed to associate media with any pre-selected internal or external business process. As examples, investigation tool 1600 and the call centers 100, 400, 900 may be applied in the context of insurance claim adjustment, technical support, merchandise return, fraud detection, or any other business process that may be enhanced through multi-media support, gathering, or dissemination.

For example, in the context of insurance claim adjustment, the media may relate to digital images (e.g., a cell phone camera picture of an intersection at which an accident occurred) and audio recordings obtained from accident sites. In a technical service environment, the media may relate to digital images and sensor readings obtained from electromechanical equipment (e.g., a digital camera picture of the cable connections on the back of a personal computer).

Thus, the investigation tool or call center operator (whether a human, or an automated media evaluation program), may view incoming incident reports or search the media database for existing incident reports, and take appropriate action. As one example, the operator may forward the incident report or media to a selected business function, additionally or alternatively triggering a workflow process.

For instance, in the context of insurance claim adjustment, the operator may recognize the incident report as a car accident. In response, the operator may optionally gather supplemental sensor media, and forward the incident report and related media to a claims agent. The incident report and media may be first placed in an investigation report prepared by the operator as explained above. The claims agent may then review and modify the incident report, and initiate steps to handle any potential claim. For example, the claims agent may contact the customer involved in the accident, make arrangements for a rental car, begin to complete documentation for the claims, and initiate or execute any other business function.

As another example, in the context of a technical service center, the operator may view an incident report and its associated media as an initial step in determining the subject matter of the incident. One determined, the operator may then forward the incident report, media, or investigation report to a technical service agent that is skilled with regard to the subject matter. To that end, the user interfaces may include interface components similar to the routing buttons 1508, 1510 that initiate transmission of the data to any particular individual.

In this regard, the operator or the technical service agent may also study the related media to determine whether a service call is warranted. Additionally, the operator or the technical service agent may also determine what tools should be obtained for the service call, and initiate obtaining such tools. Note also that if a service call is not warranted (e.g., the third party may safely perform the service), then the operator or the technical service agent may prepare an incident alert that responds to the third party with self-service instructions, directions, supporting media (e.g., a repair diagram or video), and other helpful or instructive data.

Figure 19:
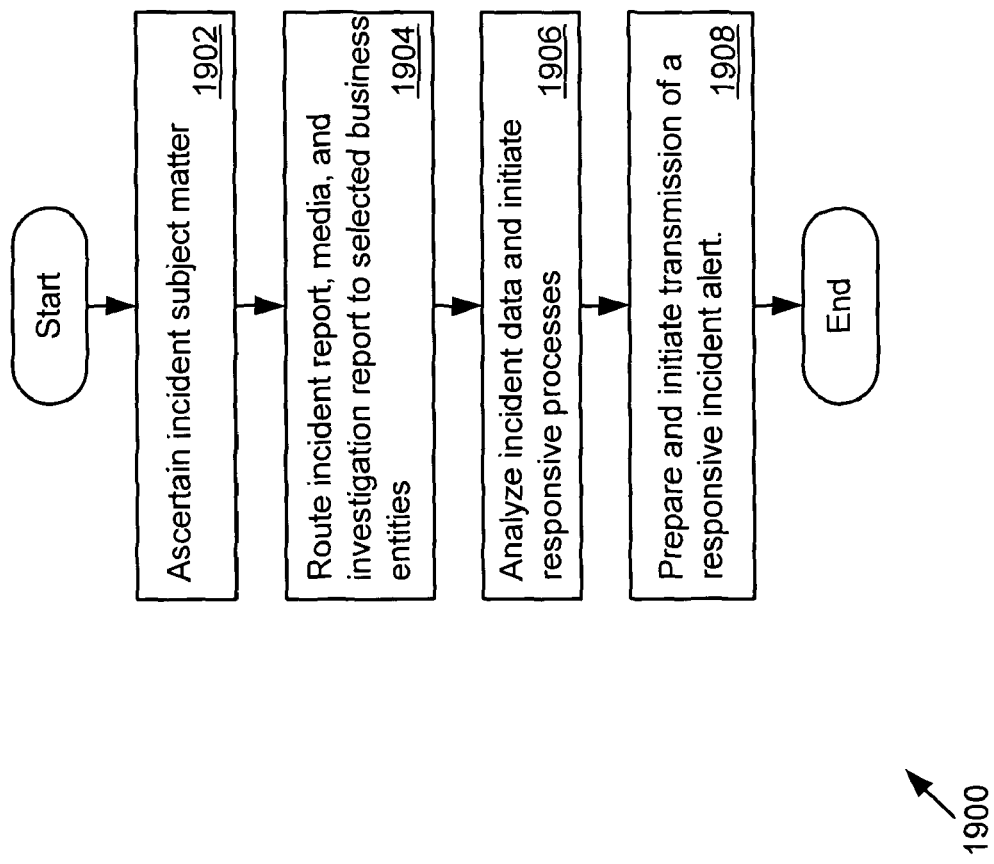
FIG. 19 illustrates a flow diagram of steps taken to analyze and route incident data to business processes or entities.

FIG. 19 summarizes the steps explained above. In particular, the operator ascertains the incident subject matter (Step 1902). To that end, as examples, the operator may analyze an incident report or its related media, or search the existing media database 112 with the investigation tool 1600. Subsequently, the operator routes the incident data to a selected processing entity or processing system (Step 1904). For example, the operator may send the incident report, related media, or an investigation report to an insurance agent, technical service agent, law, enforcement agency, sales agent, product design department, research and development department, phone or cable company representative, process or fabrication assembly line, or any other processing entity or processing system.

The incident information arrives at the processing entity or processing system, where it is analyzed (Step 1906). The analysis may trigger any number of related business processes, as examples, obtaining parts and equipment for service, scheduling a visit by an insurance agent, or responsively communicating with the third party that submitted the incident report. For instance, the business entity may then prepare a responsive incident alert for the third party and initiate the transmission of the incident alert (Step 1908).

The call centers and investigation tools described above thereby reconnect technology knowledgeable individuals with the services that they turn to for help or for information. The services thereby become more amenable to interaction with the individual. In addition, the call centers and investigation tools achieve significantly expanded capability, through multi-media integration, for rendering aid, disseminating information, and protecting citizens through law enforcement related activities.

It is therefore intended that the foregoing detailed description be regarded as illustrative rather than limiting, and that it be understood that it is the following claims, including all equivalents, that are intended to define the spirit and scope of this invention.

The invention claimed is:

1. A call center processing system comprising:
   a network infrastructure interface for receiving an incident report from an external network;
   a media database;
   a memory coupled to the media database and the network infrastructure interface, the memory comprising:
   a media aggregation program comprising instructions for:
      accepting third party media associated with the incident report and obtaining third party classification information;
      selecting incident information from the incident report;
      building a media record based on the incident information and the third party classification information; and
      storing the media record and the third party media in the media database; and
   a dispatch program comprising instructions for:
      analyzing the incident information to determine an incident location;
      determining an incident coverage area around the incident location;
      preparing an incident alert for transmission; and
      initiating transmission of the incident alert to a subscriber entity within the incident coverage area of the incident location;
   a media collection program comprising instructions for:
      initiating transmission of a sensor activation instruction to a sensor within a sensor coverage area around the incident location;
      receiving supplemental sensor media from the sensor; and
      aggregating the supplemental sensor media in the media database with at least a portion of the incident information; and
   an investigation program comprising instructions for:
      applying an automatic update filter comprising match criteria against media classification and characteristic information to determine matching supplemental sensor media; and
associating the matching supplemental sensor media with an investigation report; and
a processor coupled to the memory for executing the media aggregation program, the dispatch program, the media collection program and the investigation program.

2. The call center processing system of claim 1, where the instructions for accepting comprise: instructions for accepting the third party media from a third party submitter of the incident report.

3. The call center processing system of claim 1, where the media aggregation program further comprises instructions for obtaining supplemental incident information associated with the sensor within the sensor coverage area around the incident location, and where the instructions for storing further comprise storing the supplemental sensor media in the media database in association with the supplemental incident information.

4. The call center processing system of claim 1, where the network infrastructure interface comprises a telephone network infrastructure interface.

5. The call center processing system of claim 4, where the third party media comprises a cell phone camera image.

6. The call center processing system of claim 1, where the supplemental sensor media comprises security camera video.

7. The call center processing system of claim 1, where the supplemental sensor media comprises security microphone audio.

8. The call center processing system of claim 1, where the third party classification information comprises a third party submitter name.

9. The call center processing system of claim 8, where the third party classification information further comprises a third party telephone number.

10. The call center processing system of claim 1 where the media database is an emergency telephone number media database.

11. The call center processing system of claim 1, where the media database is a service center media database.

12. The call center processing system of claim 1, where the media database is a news center media database.

13. The call center processing system of claim 1, where the media database is a law enforcement media database.

14. A call center processing system comprising:
a network infrastructure interface for receiving an incident report from an external network;
a media database;
a memory coupled to the media database and the network infrastructure interface, the memory comprising:
a media aggregation program comprising instructions for:
accepting third party media associated with the incident report and third party classification information from the external network;
deriving incident information from the incident report;
building a media record from the incident information and the third party classification information; and
storing the media record and the third party media in the media database; and
a dispatch program comprising instructions for:
analyzing the incident information to determine an incident location;
preparing an incident alert for transmission; and
initiating transmission of the incident alert to a subscriber entity; and
a media collection program comprising instructions for:
initiating transmission of a sensor activation instruction to a sensor within a sensor coverage area around the incident location;
receiving supplemental sensor media from the sensor; and
aggregating the supplemental sensor media in the media database with at least a portion of the incident information; and
an investigation program comprising instructions for:
applying an automatic update filter comprising match criteria against media classification and characteristic information to determine matching supplemental sensor media; and
associating the matching supplemental sensor media with an investigation report; and
a processor coupled to the memory for executing the media aggregation program, the dispatch program, the media collection program and the investigation program.

15. The call center processing system of claim 14, where the dispatch program further comprises instructions for selecting the subscriber entity based on pre-determined incidents of interest to the subscriber entities.

16. The call center processing system of claim 14, where the dispatch program further comprises instructions for selecting the subscriber entity based on incident proximity.

17. The call center processing system of claim 16, where the incident proximity is with respect to the subscriber entity.

18. The call center processing system of claim 16, where the incident proximity is with respect to a location other than that of the subscriber entity.

19. The call center processing system of claim 14, where the dispatch program further comprises instructions for selecting the subscriber entity based on an incident party.

20. The call center processing system of claim 19, where the incident party has a familial relationship to the subscriber entity.

21. The call center processing system of claim 14, where the incident alert comprises at least a portion of the incident information.

22. The call center processing system of claim 14, where the incident alert comprises at least a portion of the incident information and the third party media.

23. The call center processing system of claim 14, where the incident alert comprises at least a portion of the incident information, the third party media, and an incident location map.

24. The call center processing system of claim 14, where the dispatch program further comprises instructions for initiating retrieval of media of interest to the subscriber entity from the media database, and where the incident alert includes the media of interest.

25. The call center processing system of claim 14, where the subscriber entity is a mobile communication device holder.

26. The call center processing system of claim 25, where the incident alert comprises at least a portion of the incident information.

27. The call center processing system of claim 20, where the incident alert further comprises supplemental incident information associated with an additional incident proximate to the incident location.

28. The call center processing system of claim 26, where the incident alert comprises at least a portion of the incident information and the third party media.

29. The call center processing system of claim 26, where the incident alert comprises at least a portion of the incident information, the third party media, and an incident location map.

30. The call center processing system of claim 14, further comprising a subscriber entity database, and where the dispatch program further comprises instructions for: querying the subscriber entity database to select the subscriber entity.

31. The call center processing system of claim 14, where the dispatch program further comprises instructions for: querying a subscriber location provider to determine an entity location for the subscriber entity.

32. The call center processing system of claim 31, where the subscriber location provider is a subscriber location database.

33. A call center processing system comprising:
a network infrastructure interface for receiving an incident report from an external network;
a media database;
a memory coupled to the media database and the network infrastructure interface, the memory comprising:
a media aggregation program comprising instructions for:
accepting third party media associated with the incident report and third party classification information from the external network;
deriving incident information from the incident report;
building a media record from the incident information and the third party classification information; and
storing the media record and the third party media in the media database; and
a media collection program comprising instructions for:
analyzing the incident information to determine an incident location;
initiating transmission of a sensor activation instruction to sensors near the incident location;
receiving supplemental sensor media from the sensors; and
aggregating the supplemental sensor media in the media database in association with at least a portion of the incident information; and
an investigation program comprising instructions for:
applying an automatic update filter comprising match criteria to determine matching supplemental sensor media; and
associating the matching supplemental sensor media with an investigation report; and
a processor coupled to the memory for executing the media aggregation program, the media collection program and the investigation program.

34. The call center processing system of claim 33, where the sensors are cameras near the incident location, and where the sensor activation instruction is a video capture activation instruction.

35. The call center processing system of claim 33, where the sensors are microphones near the incident location, and where the sensor activation instruction is an audio capture activation instruction.

36. The call center processing system of claim 33, where the sensors are motion detectors near the incident location, and where the sensor activation instruction is a motion capture activation instruction.

37. The call center processing system of claim 33, where the dispatch program further comprises instructions for: determining an incident coverage area around the incident location; and where the instructions for transmitting comprise:
instructions for transmitting the sensor activation instruction to sensors within the incident coverage area of the incident location.

38. The call center processing system of claim 37, where the sensors are security cameras.

39. The call center processing system of claim 37, where the sensors are microphones.

40. The call center processing system of claim 33, further comprising a sensor database, and where the media collection program further comprises instructions for: querying the sensor database to select the sensors.

41. The investigation tool of claim 33, where the instructions for initiating transmission comprise instructions for initiating transmission to the sensors through an ad-hoc sensor network.

42. The investigation tool of claim 41, where the ad-hoc sensor network comprises intermediate nodes and a principal node in communication with the network infrastructure interface.

43. The investigation tool of claim 33, where the instructions for receiving supplemental media comprise instructions for receiving from an ad-hoc sensor network.

44. The investigation tool of claim 43, where the ad-hoc sensor network comprises intermediate nodes and a principal node in communication with the network infrastructure interface.

45. The call center processing system of claim 33, where the media collection program further comprises instructions for: querying a sensor location provider to determine a sensor location for each of the sensors.

46. The call center processing system of claim 45, where the sensor location provider is a sensor location database.

47. A call center investigation tool comprising:
a media database comprising:
media incident records aggregated over time, each media record indexed according to incident information associated with an incident report; and
supplemental media records aggregated over time, each supplemental media record indexed according to at least one of geographic area, incident type, time, and date;
a memory coupled to the media database, the memory comprising an investigation program comprising instructions for:
accepting incident search parameters;
initiating execution of an incident search in the media database based on the search parameters;
displaying a selection interface comprising media record indicia associated with matching media records returned from the incident search;
displaying an investigation report interface; and
accepting report components for building an investigation report in the report interface, the report components comprising at least a portion of the incident information and selected media records; and
a processor coupled to the memory for executing the investigation program.

48. The call center investigation tool of claim 47, where the media record indicia comprise thumbnail images representing the media records.

49. The call center investigation tool of claim 47, where the incident search parameters comprise a location parameter.

50. The call center investigation tool of claim 47, where the incident search parameters comprise a location parameter and an incident coverage area parameter.

51. The call center investigation tool of claim 47, where the incident search parameters comprise an incident type parameter.

52. The call center investigation tool of claim 47, where the incident search parameters comprise an incident type parameter and a location parameter.

53. The call center investigation tool of claim 47, where the incident search parameters comprise an incident type parameter and a subject parameter.

54. The call center investigation tool of claim 47, where the incident search parameters comprise an incident type parameter, a temporal parameter, and a location parameter.

55. The call center investigation tool of claim 47, where the incident search parameters comprise an incident type parameter, a temporal parameter, a location parameter, and an incident coverage area parameter.

56. The call center investigation tool of claim 47, further comprising a report database for storing the investigation report.

57. The call center investigation tool of claim 47, where the investigation program further comprises instructions for:
   displaying an area map; and
   displaying an incident indicia on the area map responsive to a media record indicia selection.

58. The call center investigation tool of claim 47, where the investigation program further comprises instructions for:
   displaying an area map;
   displaying a sensor location icon; and
   in response to selection of the sensor location icon, displaying sensor indicia on the area map in locations from which external sensors have provided supplemental media stored in the media database.

59. The call center of claim 58, where the sensor indicia further represent external sensors associated with at least one of the matching media records.

60. The investigation tool of claim 47, where the investigation program further comprises instructions for chronologically presenting selected media incident records.

61. The investigation tool of claim 47, where the selected media incident records match the incident search parameters.

62. The investigation tool of claim 47, where at least one of the report components is an automatic update report component.

63. The investigation tool of claim 62, further comprising an automatic update filter associated with the automatic update report component.

64. The investigation tool of claim 63, where the automatic update filter comprises match criteria for determining matching submitted media.

65. The investigation tool of claim 64, where the investigation program further comprises instructions for associating the matching submitted media with the investigation report.

66. The investigation tool of claim 47, where the investigation program further comprises instructions for routing the investigation report to a selected reviewer.

67. The investigation tool of claim 66, where the selected reviewer is at least one of a law enforcement agency, claim processing center, or technical service center.

68. A method for processing incident information in a call center, the method comprising the steps of:
   obtaining incident information and media associated with an incident of interest from a third party;
   building a media record based on the incident information;
   storing the media record and the media in a media database;
   ascertaining the subject matter of the incident of interest based on the incident information and media;
   determining a processing entity for processing the incident of interest;
   routing incident data derived from the incident information and media to the processing entity;
   analyzing the incident information to determine an incident location;
   determining an incident coverage area around the incident location;
   preparing an incident alert for transmission;
   initiating transmission of the incident alert to a subscriber entity within the incident coverage area of the incident location
   initiating transmission of a sensor activation instruction to a sensor within a sensor coverage area around the incident location;
   receiving supplemental sensor media from the sensor;
   aggregating the supplemental sensor media in the media database with at least a portion of the incident information;
   applying an automatic update filter comprising match criteria against media classification and characteristic information to determine matching supplemental sensor media; and
   associating the matching supplemental sensor media with an investigation report.

69. The method of claim 68, further comprising the step of:
   initiating a business process in response to the incident of interest by the business entity.

70. The method of claim 69, further comprising the steps of:
   preparing an incident report comprising explanatory information associated with the business process; and
   initiating transmission of the responsive incident report to the third party.

71. The method of claim 68, where the step of routing comprises the step of routing to a technical support center.

72. The method of claim 68, where the step of routing comprises the step of routing to an insurance agent.

73. The method of claim 68, where the step of routing comprises the step of routing to a law enforcement agency.

74. The method of claim 68, where the step of routing comprises the step of routing to a sales agent.

75. The method of claim 68, where the step of routing comprises the step of routing to a product design department.

76. A call center processing system comprising:
   a network infrastructure interface for receiving an incident report from an external network;
   a media database;
   a memory coupled to the media database and the network infrastructure interface, the memory comprising:
      a media aggregation program comprising instructions for:
         accepting third party media associated with the incident report;
         selecting incident information from the incident report;
         building a media record based on the incident information; and
         storing the media record and the third party media in the media database;
      a media collection program comprising instructions for:
         analyzing the incident information to determine an incident location;
         determining a sensor coverage area around the incident location;

initiating transmission of a sensor activation instruction to a sensor within the sensor coverage area;
receiving supplemental sensor media from the sensor; and
aggregating the supplemental sensor media in the media database in association with at least a portion of the incident information; and
an investigation program comprising instructions for:
associating at least a portion of the supplemental sensor media with an investigation report; and
a processor coupled to the memory for executing the media aggregation program, the media collection program and the investigation program.

77. The call center processing system of claim 76, the memory further comprising a media indexing program executable with the processor, the media indexing program comprising instructions for:
accepting incident characteristic information for the third party media from the network infrastructure interface; and
adding the incident characteristic information to the media record.

78. The call center processing system of claim 77, where incident report is associated with an incident, and where the incident characteristic information comprises at least one of time, date, subject matter, and location information of the incident.

79. The call center processing system of claim 77, where the instructions for accepting incident characteristic information comprise instructions for:
presenting an incident characteristic information menu; and
accepting network infrastructure interface inputs corresponding to the incident characteristic information menu that specify the incident characteristic information.

80. The call center processing system of claim 79, where the network infrastructure interface inputs comprise touch-tone inputs.

81. The call center processing system of claim 79, where the network infrastructure interface inputs comprise voice inputs.

82. The call center processing system of claim 77, where the instructions for accepting incident characteristic information comprise instructions for:
presenting an incident characteristic information menu tree; and
accepting network infrastructure interface inputs corresponding to the incident characteristic information menu tree that specify the incident characteristic information.

83. The call center processing system of claim 82, where the network infrastructure interface inputs comprise touch-tone inputs.

84. The call center processing system of claim 77, where the incident characteristic information comprises incident characteristic information that originates with a third party operating a sensor.

85. A call center processing system comprising:
a network infrastructure interface for receiving an incident report from an external network;
a media database;
a memory coupled to the media database and the network infrastructure interface, the memory comprising:
a media aggregation program comprising instructions for:
accepting third party media associated with the incident report and third party classification information from the external network;
deriving incident information from the incident report;
building a media record from the incident information and the third party classification information; and
storing the media record and the third party media in the media database;
a media collection program comprising instructions for:
analyzing the incident information to determine an incident location;
determining a sensor coverage area around the incident location; and
initiating transmission of a media preservation instruction to a sensor within the sensor coverage area for retention of supplemental sensor media; and
an investigation program comprising instructions for:
applying match criteria against the third party media to determine matching supplement sensor media for display on a user interface; and
a processor coupled to the memory for executing the media aggregation program and the media collection program.

86. The call center processing system of claim 85, where the media collection program comprises instructions for analyzing the incident information to determine an incidence occurrence time, and where initiating the transmission of the media preservation instruction is based on the incidence occurrence time.

87. The call center processing system of claim 85, where the media preservation instruction comprises a post-incident media retention specifier.

88. The call center processing system of claim 87, where the post-incident media retention specifier comprises a retention duration for media captured by the sensor after the incident occurrence time.

89. The call center processing system of claim 88, where the sensor is a video camera and where the retention duration specifies a retention duration for video footage captured by the video camera.

90. The call center processing system of claim 88, where the sensor is a microphone and where the retention duration specifies a retention duration for audio information captured by the microphone.

91. The call center processing system of claim 87, where the post-incident media retention specifier comprises a retention extent for media captured by the sensor after the incident occurrence time.

92. The call center processing system of claim 91, where the sensor is a video camera and where the retention extent specifies a time span of video footage captured by the video camera.

93. The call center processing system of claim 91, where the sensor is a microphone and where the retention extent specifies a time span for audio information captured by the microphone.

94. The call center processing system of claim 86, where the media preservation instruction comprises a pre-incident media retention specifier.

95. The call center processing system of claim 94, where the pre-incident media retention specifier comprises a retention duration for media captured by the sensor prior to the incident occurrence time.

96. The call center processing system of claim 94, where the sensor is a video camera and where the retention duration specifies a retention duration for video footage captured by the video camera.

97. The call center processing system of claim 94, where the sensor is a microphone and where the retention duration specifies a retention duration for audio information captured by the microphone.

98. The call center processing system of claim 94, where the pre-incident media retention specifier comprises a retention extent for media captured by the sensor prior to incident occurrence time.

99. The call center processing system of claim 88, where the sensor is a microphone and where the retention extent specifies a time span of audio information captured by the microphone.

100. The call center processing system of claim 86, where the media collection program further comprises instructions for:

determining an incident coverage area around the incident location; and where the instructions for transmitting comprise:

instructions for transmitting the media preservation instruction to sensors within the incident coverage area of the incident location.

101. The call center processing system of claim 100, further comprising a sensor database, and where the media collection program further comprises instructions for: querying the sensor database to select the sensors.

102. The call center processing system of claim 101, where the media collection program further comprises instructions for: querying a sensor location provider to determine a sensor location for each of the sensors.

* * * * *

UNITED STATES PATENT AND TRADEMARK OFFICE
CERTIFICATE OF CORRECTION

| | | |
|---|---|---|
| PATENT NO. | : 7,792,273 B2 | |
| APPLICATION NO. | : 10/663592 | |
| DATED | : September 7, 2010 | |
| INVENTOR(S) | : Andrew E. Fano et al. | |

It is certified that error appears in the above-identified patent and that said Letters Patent is hereby corrected as shown below:

Column 8

Line 6, delete "the" and insert --that--.

Column 10

Line 16, delete "may" and insert --many--.

Column 11

Line 43, delete "the" and insert --to--.
Line 54, delete "call" and insert --cell--.

Column 17

Line 8, insert --to-- after "operator".

Column 18

Line 38, delete "call" and insert --cell--.
Line 61, delete "On" and insert --One--.

Column 20

Line 6, delete "instigation" and insert --investigation--.

Column 21

Line 40, delete "One" and insert --Once--.
Line 67, delete "," after "law".

Signed and Sealed this
Nineteenth Day of April, 2011

David J. Kappos
*Director of the United States Patent and Trademark Office*

CERTIFICATE OF CORRECTION (continued)
U.S. Pat. No. 7,792,273 B2

In the Claims

Column 28

Line 14, insert --;-- after "location".